US012508423B2

(12) United States Patent
Demiryurek et al.

(10) Patent No.: US 12,508,423 B2
(45) Date of Patent: Dec. 30, 2025

(54) DEVICE FOR TISSUE ELECTROTRANSFER USING A MICROELECTRODE

(71) Applicant: Rutgers, the State University of New Jersey, New Brunswick, NJ (US)

(72) Inventors: Yasir Demiryurek, Somerset, NJ (US); Hao Lin, Montgomery, NJ (US); Sunshine Littlecreek, Flanders, NJ (US); Jerry Shan, Bridgewater, NJ (US); David Shreiber, Whitehouse Station, NJ (US); Miao Yu, Parlin, NJ (US); Jeffrey Zahn, Princeton, NJ (US)

(73) Assignee: Rutgers, The State University of New Jersey, New Brunswick, NJ (US)

(*) Notice: Subject to any disclaimer, the term of this patent is extended or adjusted under 35 U.S.C. 154(b) by 1085 days.

(21) Appl. No.: 17/423,027

(22) PCT Filed: Feb. 4, 2020

(86) PCT No.: PCT/US2020/016555
§ 371 (c)(1),
(2) Date: Jul. 14, 2021

(87) PCT Pub. No.: WO2020/163310
PCT Pub. Date: Aug. 13, 2020

(65) Prior Publication Data

US 2022/0080193 A1 Mar. 17, 2022

Related U.S. Application Data

(60) Provisional application No. 62/800,781, filed on Feb. 4, 2019.

(51) Int. Cl.
*A61N 1/32* (2006.01)
*A61N 1/05* (2006.01)

(52) U.S. Cl.
CPC ........... *A61N 1/327* (2013.01); *A61N 1/0502* (2013.01)

(58) Field of Classification Search
CPC ...... A61N 1/327; A61N 1/0502; A61N 1/306; A61N 1/325; A61N 1/0412; A61N 1/0428;
(Continued)

(56) References Cited

U.S. PATENT DOCUMENTS 5,993,434 A 11/1999 Dev et al.
6,520,950 B1 2/2003 Hofmann et al.
(Continued)

FOREIGN PATENT DOCUMENTS

CA 3124709 A1 8/2020
CN 101939047 A 1/2011
(Continued)

OTHER PUBLICATIONS

International Search Report and Written Opinion for Int'l Application No. PCT/US2020/016555, titled: Device For Tissue Electrotransfer Using A Microelectrode, Dated: May 28, 2020.
(Continued)

*Primary Examiner* — Michael J Tsai
*Assistant Examiner* — Neeraja Gollamudi
(74) *Attorney, Agent, or Firm* — Hamilton, Brook, Smith & Reynolds, P.C.

(57) ABSTRACT

A minimally invasive penetrating microelectrode array is used to generate localized electric field "hotspots" for delivering biomolecules, such as nucleic acid or protein molecules, into cells located in the epidermal or dermal layer of the skin via transient membrane permeabilization. The "hotspots" can be controlled by selectively insulating the penetrating microelectrodes at specific regions. The portion of microelectrodes that are not covered with insulation coating
(Continued)

can be coated with nucleic acid or protein vaccine vector, or other biomolecules to be delivered. Upon insertion into the skin, an anchor microelectrode region mechanically anchors the penetrating microelectrode to position the target tissue microelectrode region, so as to selectively align the biomolecule coating with cells located in the tissue location. The biomolecule coating will dissolve when in contact with surrounding tissue. By applying an electrical pulse, the biomolecules can be delivered into surrounding cells.

26 Claims, 25 Drawing Sheets

(58) Field of Classification Search
CPC .......... A61M 37/00; A61M 2037/0007; A61M 2205/054; A61M 2205/055; A61M 2205/0093; A61M 2037/0023; A61M 2037/0046
See application file for complete search history.

(56) References Cited

U.S. PATENT DOCUMENTS 6,521,430 B1 2/2003 Orwar et al.
6,603,998 B1 * 8/2003 King ...................... C12N 15/87 604/20
7,781,195 B1 8/2010 Heller et al.
8,705,223 B2 4/2014 Villemejane et al.
9,020,605 B2 4/2015 McCluskey et al.
9,913,978 B2 3/2018 Broderick et al.
11,318,305 B2 * 5/2022 Bahrami ................ A61N 1/327
2006/0293725 A1 12/2006 Rubinsky et al.
2008/0091135 A1 * 4/2008 Draghia-Akli ......... A61N 1/327 604/20
2008/0214986 A1 9/2008 Ivorra et al.
2008/0231337 A1 * 9/2008 Krishnaswamy ...... H03K 3/537 327/291
2011/0118811 A1 5/2011 Mllemejane et al.
2012/0123318 A1 * 5/2012 Ek ........................ A61N 1/0476 604/20
2012/0323165 A1 12/2012 Broderick et al.
2013/0066296 A1 3/2013 Broderick et al.
2013/0123744 A1 5/2013 Walters et al.
2013/0190851 A1 * 7/2013 Schouenborg ....... A61N 1/0536 607/116
2013/0345780 A1 * 12/2013 Tabada ..................... A61B 5/24 216/14
2017/0080221 A1 3/2017 Dai
2018/0169399 A1 * 6/2018 Housley ............... A61N 1/0575
2018/0258379 A1 * 9/2018 Zahn .................. G01N 15/1023
2020/0170523 A1 * 6/2020 Deligianni ........... A61N 1/0531
2021/0346665 A1 * 11/2021 Xu .................... A61M 37/0015
2022/0362577 A1 * 11/2022 Kinsey ................. A61K 33/243
2023/0001189 A1 1/2023 Bahrami et al.

FOREIGN PATENT DOCUMENTS

CN 113613711 B 9/2024
HK 40060057 B 9/2023
IN 471525 11/2023
JP 2018-510015 A 4/2018
WO 2005049108 A2 6/2005
WO 2013/096584 A2 6/2013
WO 2016161201 A2 10/2016
WO 2020/163310 A1 8/2020

OTHER PUBLICATIONS

Huang et al., "A minimally invasive in vivo electroporation method utilizing flexile electrode and microneedle roller," 2017 19th International Conference on Solid-State Sensors, Actuators and Microsystems (Transducers), IEEE, Jun. 18, 2017, pp. 1684-1687.
Hooper et al., "Smallpox DNA vaccine delivered by by novel skin electroporation device protects mice against intranasal poxvirus challenge," ScienceDirect, Vaccine 25 (2007), pp. 1814-1823.
McCoy et al., "A multi-head intradermal electroporation device allows for tailored and increased dose DNA vaccine delivery to the skin," Human Vaccines & Immunotherapeutics (2015), 11:746-754.
El-Kamary et al., "Safety and Tolerability of the Easty Vax: Clinical Epidermal Electroporation System in Healthy Adults," Molecular Therapy (2011), 20:214-220.
International Preliminary Report on Patentability for International Application No. PCT/US2020/016555, "Device and Method for Tissue Electrotransfer Using a Microelectrode" dated Aug. 10, 2021.

* cited by examiner

Pulsed Needle

Non-Pulsed Needle

⊙ Image analysis code developed and performed.

DEVICE FOR TISSUE ELECTROTRANSFER USING A MICROELECTRODE

RELATED APPLICATION

This application is the U.S. National Stage of International Application No. PCT/US2020/016555, filed on Feb. 4, 2020, which designates the U.S., published in English, and claims the benefit of U.S. Provisional Application No. 62/800,781, filed on Feb. 4, 2019. The entire teachings of the above applications are incorporated herein by reference.

BACKGROUND

Over the last 40 years, electroporation has emerged as an attractive approach for delivering exogenous biologic materials (i.e., DNA, RNA, or protein factors) into cells and tissues. The first reports of electroporation as a means of cellular delivery were in the 1980's (1) with many of the initial transdermal efforts emerging in the early 1990's (2-7). Electroporation mediated delivery has been explored for transdermal delivery of small molecule therapeutics for systemic absorption into the bloodstream via electroporation of the cutaneous layers of the skin followed by passive diffusive, iontophoretic transport of therapeutics through the skin (4), or other penetration mechanisms (8), electrochemotherapy (ECT) (9-17), and gene electrotransfer (GET) (18, 19). With the emergence of DNA based vaccines, gene editing techniques (i.e., CRISPR Cas9 targeted gene editing), and FDA approval of gene therapy products (i.e., CAR T-cell therapy), there has been a renewed interest in GET.

Electroporation has long been explored as a means of cellular and tissue delivery with numerous medical applications (34). During electroporation, cells or tissues are exposed to a brief, high strength, electric field that induces pore formation in the cell membrane facilitating molecular delivery across the membrane barrier. Reversible electroporation allows transient permeabilization of the cell membrane to deliver exogenous materials into cells followed by cellular recovery. Irreversible electroporation (both thermal and non-thermal), on the other hand, causes irrecoverable membrane damage, either directly killing cells or promoting cellular apoptosis. Both reversible and irreversible electroporation have been explored medically with reversible electroporation being used for therapeutic and vector delivery and irreversible electroporation being used as a tissue ablation technique, especially to treat cancerous tumors. Transdermal electroporation has typically been focused on reversible electroporation in order to reduce the permeation barrier of the skin and promoting uptake of vectors for gene electrotransfer (GET).

Transdermal electroporation has been seen as a means for transforming skin cells through GET or increasing transdermal permeation of therapeutics through the skin. In particular, the use of transdermal electroporation has been explored as a means to deliver DNA based vaccine products with sufficient expression and immunogenicity to confer a protective immunological response. The epidermis, in particular, is targeted for vaccination due to the high concentration of dendritic cells (35,36). As a 2016 editorial on the clinical potential of electroporation for gene therapy and DNA based vaccine delivery noted, there are several commercial electroporation vaccination platforms in development including the CELLECTRA, Easy Vax, MedPulser, Trigrid, Dermavax, OncoSec, and Cliniporator, with the majority of devices (62%) undergoing Phase I clinical trials (37). The most advanced product is the CELLECTRA system by Inovio which is currently in Phase III trials for IM delivery of a human papilloma virus (HPV) vaccine (38).

Transdermal electroporation has traditionally been applied either as a surface electrode or as penetrating electrodes which are inserted into skin or muscle. When a surface electrode is used, a high intensity electric field is required to permeabilize the highly keratinized stratum corneum (SC); the outmost barrier layer of the skin. However, once the SC is electroporated the underlying epidermal and dermal tissues are then exposed to this high field intensity in an uncontrolled fashion which can lead to skin irritation, edema and damage. When penetrating electrode sets are used they are often spaced several centimeters apart and inserted deep into the skin or below the skin into muscle. Higher intensity pulses are also often used in order to permeabilize the largest tissue volume surrounding the electrodes which also leads to tissue damage around the electrodes where the field intensities are highest. Further, DNA vectors used during GET are usually delivered through an intradermal (ID) or intramuscular (IM) injection of a few hundred μl to ml volumes. The DNA injection itself may lead to transfection efficiency variability where the injected DNA may not be localized in the targeted tissues undergoing electroporation. For example, clinical studies utilizing ID injection have used a minimum of 600 μgs of DNA plasmid; and quantities as large as even several milligrams are often injected to ensure sufficient cellular uptake. However, a significant fraction of the solution may be delivered to the subcutaneous region, as opposed to the dermal or epidermal layers, leading to a higher cost vaccine due to the large amount of DNA required for GET.

Despite decades of development and multiple commercial efforts, transdermal electroporation still faces many challenges to clinical adoption. The major bottlenecks to be addressed are 1) low delivery/transfection efficiencies; 2) limited substances which can permeate the skin at therapeutic levels; 3) variability in delivery efficiencies; 4) skin irritation, edema and scarring following trans-dermal electroporation. These impediments and persistent issues plaguing transdermal electroporation have constrained its clinical use (39) and there are currently no FDA approved electroporation devices on the market.

Although there are numerous advantages of electroporation for use in a variety of different settings, such as the advantages of being a minimally invasive and non-viral cell transfection technique, the inherent tradeoff between cell/tissue damage and transfection efficiency has plagued the use of electroporation as a transdermal drug delivery platform (26). Amongst the problems encountered during dermal electroporation, low delivery efficiencies coupled with skin irritation and scarring (27, 28) are the most prominent obstacles to be addressed. There is, therefore, an ongoing need for improved techniques of tissue electrotransfer.

SUMMARY

An embodiment according to the invention is related to a minimally invasive penetrating microelectrode array to be used to generate localized electric field "hotspots" for delivering biomolecules, such as nucleic acid or protein molecules, into cells located in the epidermal or dermal layer of the skin via transient membrane permeabilization. The "hotspots" can be controlled by selectively insulating the penetrating microelectrodes at specific regions. The portion of microelectrodes that are not covered with insulation coating can be coated with nucleic acid or protein vaccine vector, or other biomolecules to be delivered. Upon insertion into the skin, an anchor microelectrode region mechanically anchors the penetrating microelectrode to position the target tissue microelectrode region, so as to selectively align the biomolecule coating with cells located in the tissue location. The biomolecule coating will dissolve when in contact with surrounding tissue. By applying an electrical pulse, the biomolecules can be delivered into surrounding cells.

In one embodiment according to the invention, a microelectrode device for tissue electrotransfer comprises a penetrating microelectrode. The penetrating microelectrode comprises (i) a target tissue microelectrode region comprising an electrically conductive surface to selectively deliver, via tissue electrotransfer, a biomolecule to cells located in a tissue location; and (ii) an anchor microelectrode region to mechanically anchor the penetrating microelectrode to position the target tissue microelectrode region to selectively deliver the biomolecule to cells located in the tissue location. An electrical connection connects the penetrating microelectrode to a voltage source.

In further, related embodiments, the anchor microelectrode region may be at or near a distal end of the penetrating microelectrode. The microelectrode device may comprise electrical insulation on a surface of the penetrating microelectrode, distinct from the electrically conductive surface of the target tissue microelectrode region. The microelectrode device may comprise electrical insulation on a surface of the anchor microelectrode region. The microelectrode device may comprise a biomolecule coating, comprising the biomolecule to be selectively delivered, on at least part of a surface of the target tissue microelectrode region. The tissue location may be below a stratum corneum layer of skin and at least one of (i) within at least part of an epidermal layer of skin and (ii) within at least part of the dermal layer of skin. The tissue location may be within at least a part of only an epidermal layer of skin. The anchor microelectrode region may comprise a barb; and may comprise an adhesion surface coating. The biomolecule coating may be dissolvable when surrounded by skin tissue; and may comprise at least one of a nucleic acid and a protein.

In other, related embodiments, the electrical insulation may comprise an insulating polymer deposited on the penetrating microelectrode. The microelectrode device may comprise more than one of the penetrating microelectrode, in which a center-to-center spacing of the more than one of the penetrating microelectrode comprises a spacing between about 300 micrometers and about 1.5 millimeters. The length of the penetrating microelectrode may comprise a length between about 225 micrometers and about 1250 micrometers. The penetrating microelectrode may comprise at least one of: a needle comprising a tapered tip; and a needle comprising a lateral protrusion. The penetrating microelectrode may comprise a diameter between about 100 micrometers and about 500 micrometers. The electrical connection may apply a pulsed voltage from the voltage source to the penetrating microelectrode to create a transient permeabilization of a cell membrane of tissue in at least one of an epidermal layer of skin and a dermal layer of skin. The electrical connection may apply a voltage from the voltage source to the penetrating microelectrode to create a maximum electric field strength of between about 0.1 kilovolts (kV) per centimeter and about 10 kilovolts (kV) per centimeter in skin tissue surrounding the penetrating microelectrode. The electrical connection may comprise a connection defined by photolithography, the penetrating microelectrode may comprise an electrode base defined by photolithography, and the penetrating microelectrode may comprise electroplated metal. The microelectrode device may comprise more than one of the penetrating microelectrode, and the electrical connection may comprise an electrically independent connection to two or more of the more than one penetrating microelectrodes. The device may comprise more than one target tissue microelectrode region each to selectively deliver a different biomolecule.

In further, related embodiments, the microelectrode device may further comprise a modeling processor, which may comprise a tissue level electric field prediction module and a cellular level simulation module. The modeling processor may be configured to determine tissue locations to which to selectively deliver, via tissue electrotransfer, a biomolecule to cells located in the tissue location. The modeling processor may be configured to determine a control voltage delivered by the voltage source to the penetrating microelectrode.

In another embodiment according to the invention, a method of performing tissue electrotransfer with a penetrating microelectrode comprises anchoring a penetrating microelectrode, using an anchor microelectrode region of the penetrating microelectrode, such that a target tissue microelectrode region of the penetrating microelectrode, comprising an electrically conductive surface, is positioned to selectively deliver a biomolecule to cells located in a tissue location; and applying a voltage to the penetrating microelectrode to deliver the biomolecule to the cells located in the tissue location. The penetrating microelectrode may comprise any of the microelectrode devices taught herein.

In further, related embodiments, the method may further comprise, using a modeling processor, predicting a tissue level electric field and performing a cellular level simulation of the tissue location. The modeling processor may determine tissue locations to which to selectively deliver, via tissue electrotransfer, a biomolecule to cells located in the tissue location. The method may comprise using a modeling processor to control a voltage delivered by the voltage source to the penetrating microelectrode.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

An embodiment according to the invention provides a minimally invasive penetrating microelectrode array with targeted delivery of biomolecules, such as nucleic acids or proteins, to distinct layers of the skin. The epidermis contains a higher cell density than the dermis as well as a high concentration of dendritic cells and is therefore an attractive target for delivery of biomolecules such as nucleic acid or protein vectors. The penetrating microelectrode array can achieve efficient, targeted tissue gene electrotransfer (GET) specific to the epidermis or dermis. Epidermal transfection may demonstrate the highest degree of transfection due to the higher epidermal cell density. Targeted delivery of biomolecules, such as vector delivery and tissue transfection, can be achieved by selectively insulating the penetrating microelectrodes of the array and coating them with plasmid DNA (pDNA) vectors (or other biomolecules, such as nucleic acids or proteins) followed by efficiently electroporating the tissue at focused electric field “hotspots” which surround the electrodes placed within the epidermal and/or dermal layers of skin. This co-localizes both the biomolecule delivery and electric pulses to the same tissue volume, to improve skin GET efficiency or other biomolecule delivery. In some embodiments, by monitoring tissue impedance prior to, and following, pulse application, the degree of cell permeabilization and subsequent tissue GET can be monitored through a drop in the tissue impedance proportional to the magnitude of the electric pulse used.

This approach, in accordance with an embodiment of the invention, allows lower voltages and field intensities to be used, limiting tissue damage while localizing biomolecule delivery, such as tissue transfection, within the outmost layers of the viable dermis and epidermis. An embodiment can, therefore, substantially improve targeted tissue transfection efficiency while avoiding low transfection efficiency and skin irritation.

Figure 1:
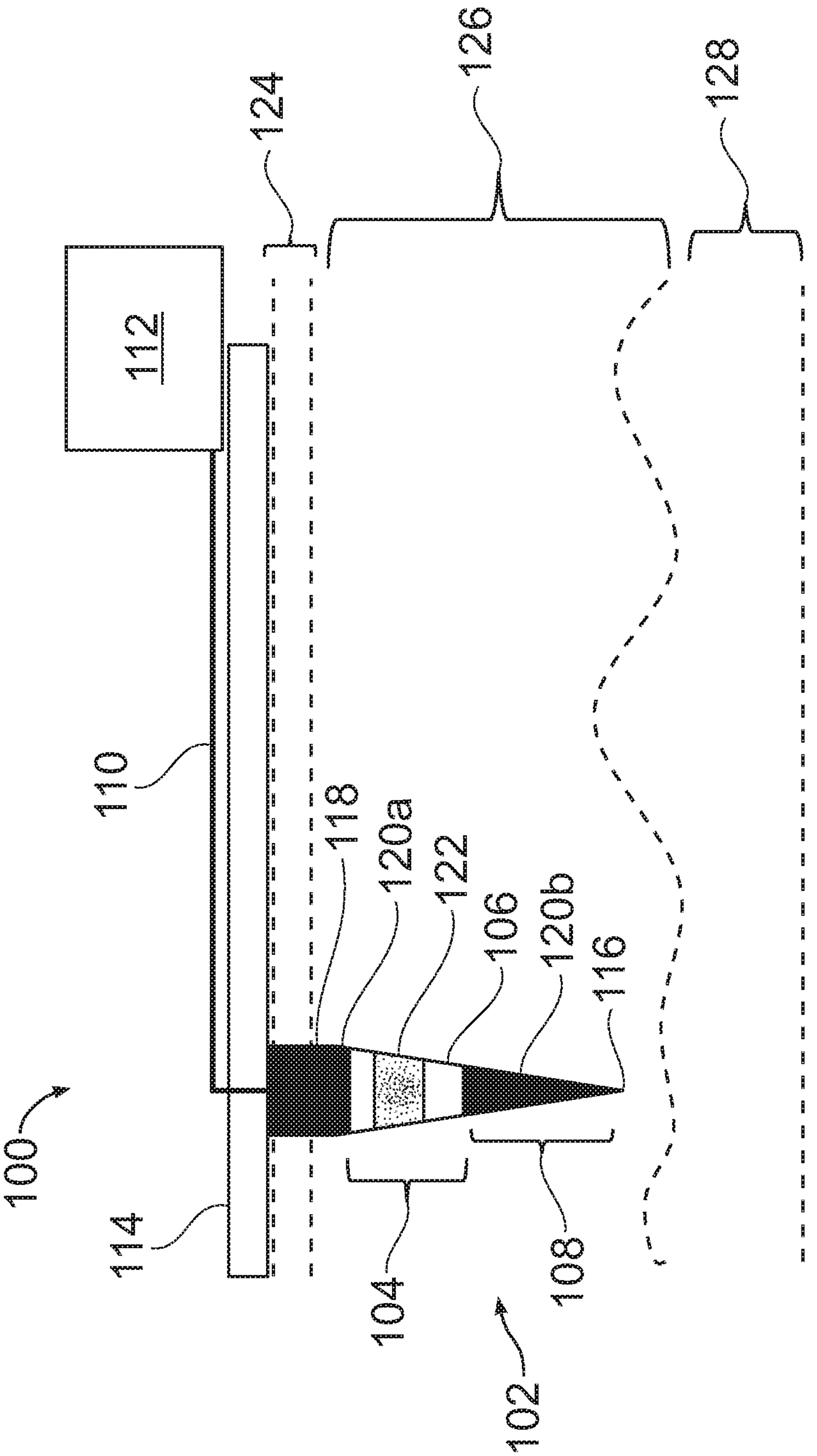
FIG. 1 is a schematic diagram of a microelectrode device for tissue electrotransfer, in accordance with an embodiment of the invention.

FIG. 1 is a schematic diagram of a microelectrode device 100 for tissue electrotransfer, in accordance with an embodiment of the invention. The microelectrode device 100 comprises a penetrating microelectrode 102, such as a needle with a tapered tip sufficiently sharp to penetrate skin tissue. The penetrating microelectrode 102 comprises a target tissue microelectrode region 104 comprising an electrically conductive surface 106, such as a conductive metal surface, that selectively delivers a biomolecule to cells located in a tissue location, such as the skin tissue surrounding the penetrating microelectrode 102, via tissue electrotransfer. The penetrating microelectrode 102 also comprises an anchor microelectrode region 108 to mechanically anchor the penetrating microelectrode 102 to position the target tissue microelectrode region 104 to selectively deliver the biomolecule to the cells located in the tissue location. For example, the anchor microelectrode region 108 can have a coating (such as those discussed further herein), that assists in holding the penetrating microelectrode 102 within skin tissue into which the penetrating microelectrode 102 is inserted, for instance by providing sufficient friction against motion of the penetrating microelectrode 102 within the skin tissue. An electrical connection 110 connects the penetrating microelectrode 102 to a voltage source 112. For example, the penetrating microelectrode 102 can be made of (or have a core or other portion made of) a conductive metal, and electrical connection 110 can be a conductive trace or other electrical connection on an electrical circuit board or other mounting frame 114. The voltage source 112 can, for example, be a power supply configured to deliver the voltages, including pulsed voltages, that are taught further herein.

Continuing with reference to FIG. 1, the anchor microelectrode region 108 can be at or near a distal end 116 of the penetrating microelectrode 102. As used herein, a "distal end" 116 of the penetrating microelectrode 102 is the end of the penetrating microelectrode 102 that is inserted most deeply into skin tissue, while the "proximal end" 118 is the opposite end, which is nearest to the mounting frame 114. The microelectrode device 100 can comprise electrical insulation 120*a* on a surface of the penetrating microelectrode 102, that is distinct from the electrically conductive surface 106 of the target tissue microelectrode region 104. The electrical insulation 120*a* can comprise an insulating polymer deposited on the penetrating microelectrode, such as, for example, of a parylene (poly(p-xylylene)) film deposited by chemical vapor deposition (CVD), as discussed below in connection with the example of FIG. 5. For example, more than one distinct regions 120*a*, 120*b* of electrical insulation 120 can, between them, define the target tissue microelectrode region 104, which has the electrically conductive surface 106. The electrical insulation can be on a surface 120*b* of the anchor microelectrode region 108, and can serve as both electrical insulation and as the coating of the anchor microelectrode region 108 that assists in holding the penetrating microelectrode 102 within the skin tissue into which the penetrating microelectrode 102 is inserted. For example, a coating of a parylene (poly(p-xylylene)) film deposited by chemical vapor deposition (CVD) can serve both as electrical insulation and to anchor the microelectrode by providing sufficient friction against motion of the penetrating microelectrode 102 within the skin tissue. The microelectrode device can comprise a biomolecule coating 122, comprising the biomolecule to be selectively delivered, on at least part of a surface of the target tissue microelectrode region 104, which may be the entire surface of the target tissue microelectrode region 104. The biomolecule coating 122 can, for example, include a nucleic acid (as defined in more detail below, for example, DNA or RNA) or protein. The biomolecule coating 122 can be dissolvable when surrounded by skin tissue. If the entire surface of the target tissue microelectrode region 104 is coated with the biomolecule coating 122, the target tissue microelectrode region 104 has a sufficiently electrically conductive surface 106, after the biomolecule coating 122 is dissolved when surrounded by the skin tissue, so that the electroporation can be performed by the target tissue microelectrode region 104. In one example, the biomolecule coating 122 can include a plasmid DNA (pDNA) vector that is to be delivered by electroporation to cells located in the surrounding tissue. The tissue location containing the cells to which the biomolecule is to be delivered can be below a stratum corneum layer 124 of skin, and selectively within either the epidermal layer 126 of skin, the dermal layer 128 of skin, or both the epidermal layer 126 and the dermal layer 128. In one example, the tissue location is selectively within only the epidermal layer 126 of skin.

Figure 2:
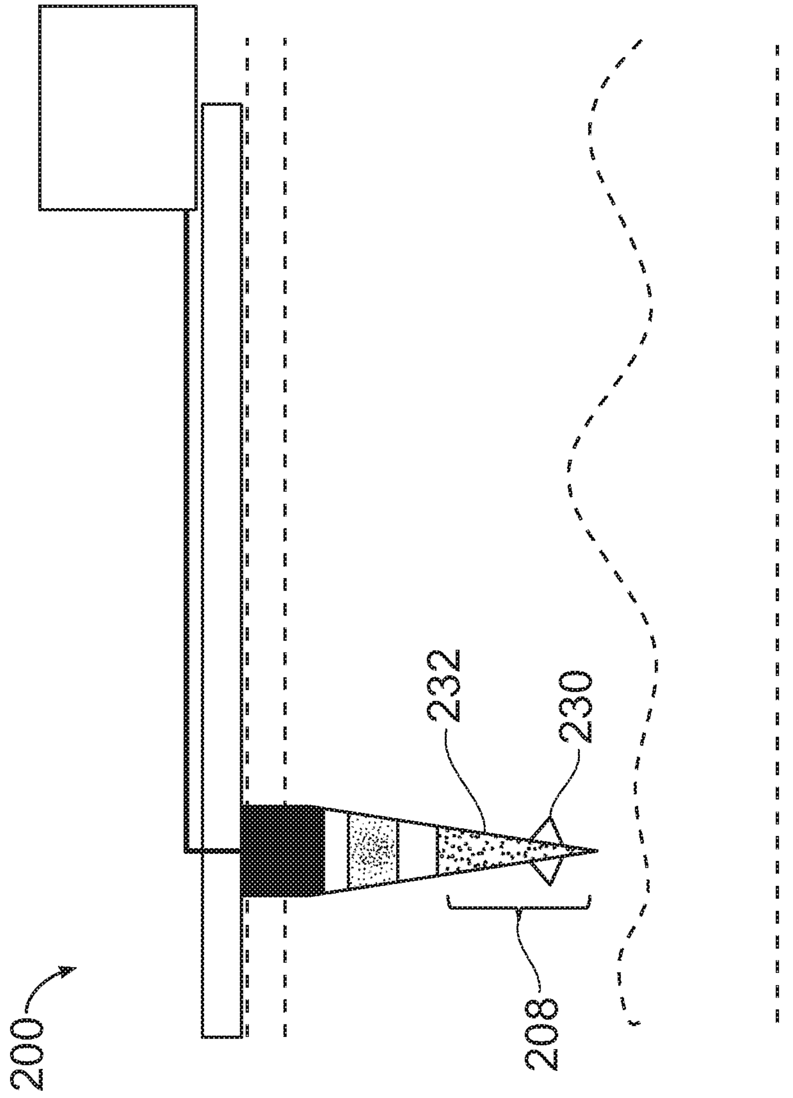
FIG. 2 is a schematic diagram of a microelectrode device for tissue electrotransfer, including alternatives for an anchor microelectrode region, in accordance with an embodiment of the invention.

FIG. 2 is a schematic diagram of a microelectrode device 200 for tissue electrotransfer, including alternatives for an anchor microelectrode region 208, in accordance with an embodiment of the invention. Although it is envisaged that the anchor microelectrode region 208 should be minimally harmful to surrounding tissue, it is possible in some embodiments that the anchor microelectrode region 208 can comprise a barb 230, or other structure to assist with anchoring; and can comprise an additional, adhesion surface coating 232 to assist with anchoring. The barb 230 can, for example, be a bioresorbable barb, which can have a short length of about 500 micrometers or less. The penetrating microelectrode can be a needle comprising a tapered tip (as in FIG. 1); a needle comprising a lateral protrusion, such as a barb 230 (of FIG. 2); or both.

Figure 3:
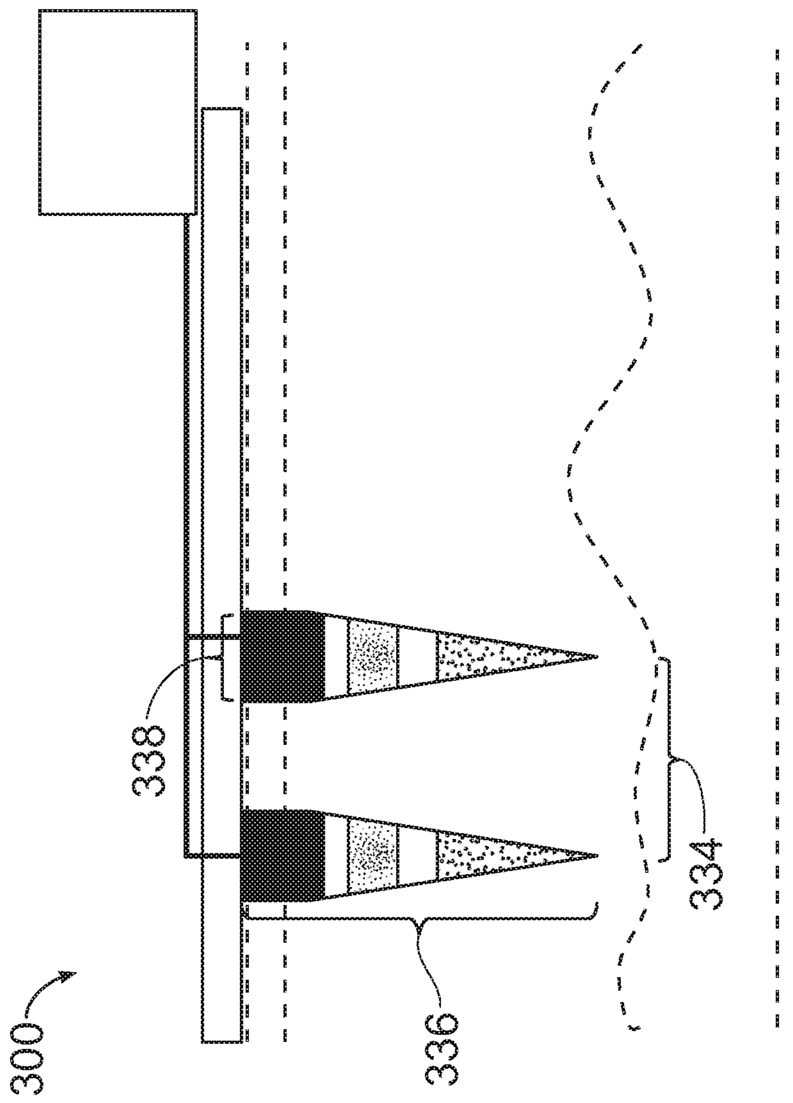
FIG. 3 is a schematic diagram of a microelectrode device for tissue electrotransfer, including example dimensions of penetrating microelectrodes, in accordance with an embodiment of the invention.

FIG. 3 is a schematic diagram of a microelectrode device 300 for tissue electrotransfer, including example dimensions of penetrating microelectrodes, in accordance with an embodiment of the invention. The microelectrode device 300 can comprise more than one of the penetrating microelectrode, in which a center-to-center spacing 334 of the more than one of the penetrating microelectrode comprises a spacing between about 300 micrometers and about 1.5 millimeters. The length 336 of the penetrating microelectrode can comprise a length between about 225 micrometers and about 1250 micrometers. The penetrating microelectrode can comprise a diameter 338 between about 100 micrometers and about 500 micrometers.

Figure 22:
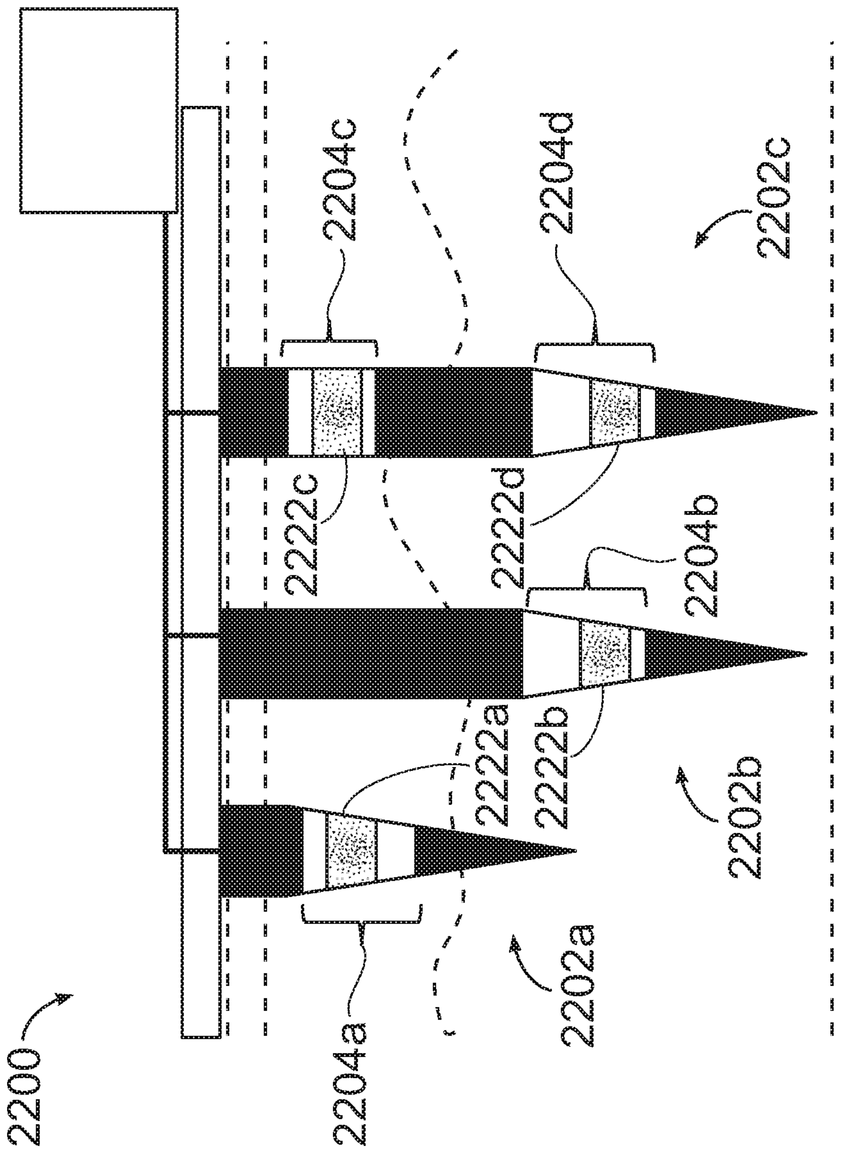
FIG. 22 is a schematic diagram of a microelectrode device for tissue electrotransfer that uses multiplexing of more than one target tissue microelectrode region, in accordance with an embodiment of the invention.

FIG. 22 is a schematic diagram of a microelectrode device 2200 for tissue electrotransfer that uses multiplexing of more than one target tissue microelectrode region, in accordance with an embodiment of the invention. In this embodiment, the device includes more than one target tissue microelectrode region each to selectively deliver a different biomolecule. With reference to the example of FIG. 22, more than one target tissue microelectrode regions 2204*a-d* is used, where different target microelectrode regions include more than one different biomolecule coating 2222*a-d*. For example, more than one different target microelectrode regions 2204*c* and 2204*d* on the same penetrating microelectrode 2202*c* can be coated with more than one different biomolecule coatings 2222*c* and 2222*d*. In another example, more than one different penetrating microelectrodes 2202*a* and 2202*b* in the same device can have more than one different target tissue microelectrode regions 2204*a* and 2204*b*, which can be coated with more than one different biomolecule coatings 2222*a* and 2222*b*. For example, different biomolecules can be delivered to different layers of skin, such as one biomolecule within at least part of an epidermal layer of skin and a different biomolecule within at least part of the dermal layer of skin, using one or more of the arrangements of the type illustrated in FIG. 22.

Figure 4:
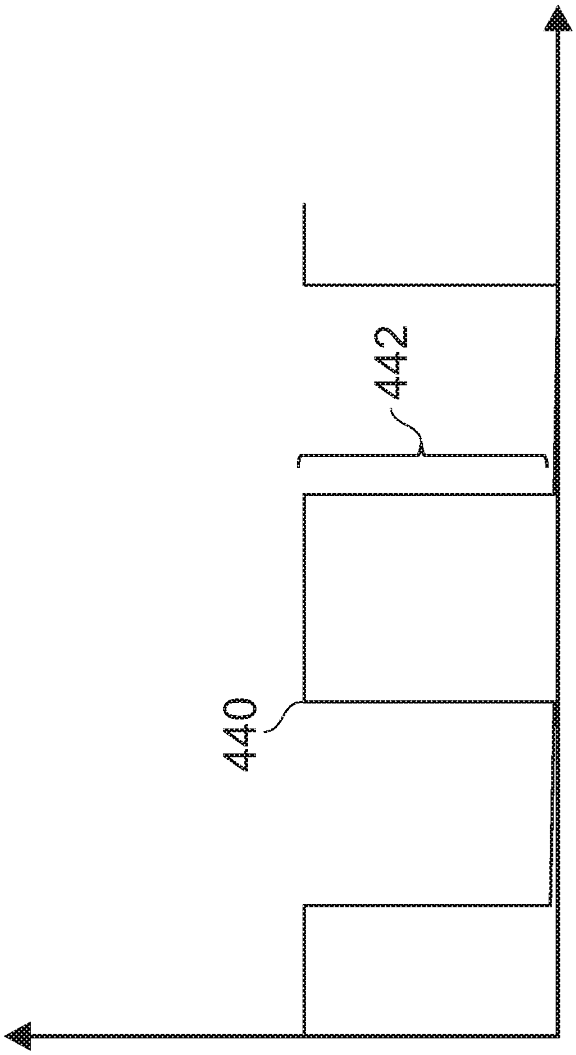
FIG. 4 is a graph illustrating pulsed voltages applied from a voltage source to a penetrating microelectrode to create a transient permeabilization of a cell membrane of tissue in at least one of an epidermal layer of skin and a dermal layer of skin, in accordance with an embodiment of the invention.

FIG. 4 is a graph illustrating pulsed voltages 440 applied from a voltage source (see 112 in FIG. 1) to a penetrating microelectrode to create a transient permeabilization of a cell membrane of tissue in at least one of an epidermal layer of skin and a dermal layer of skin, in accordance with an embodiment of the invention. The electrical connection (see 110 in FIG. 1) can apply a pulsed voltage from the voltage source (see 112 in FIG. 1) to the penetrating microelectrode to create a transient permeabilization of a cell membrane of tissue in at least one of an epidermal layer of skin and a dermal layer of skin. With reference to FIG. 4, the electrical connection can apply a voltage from the voltage source to the penetrating microelectrode to create a maximum electric field strength 442 of between about 0.1 kilovolts (kV) per centimeter and about 10 kilovolts (kV) per centimeter in skin tissue surrounding the penetrating microelectrode.

Figure 25:
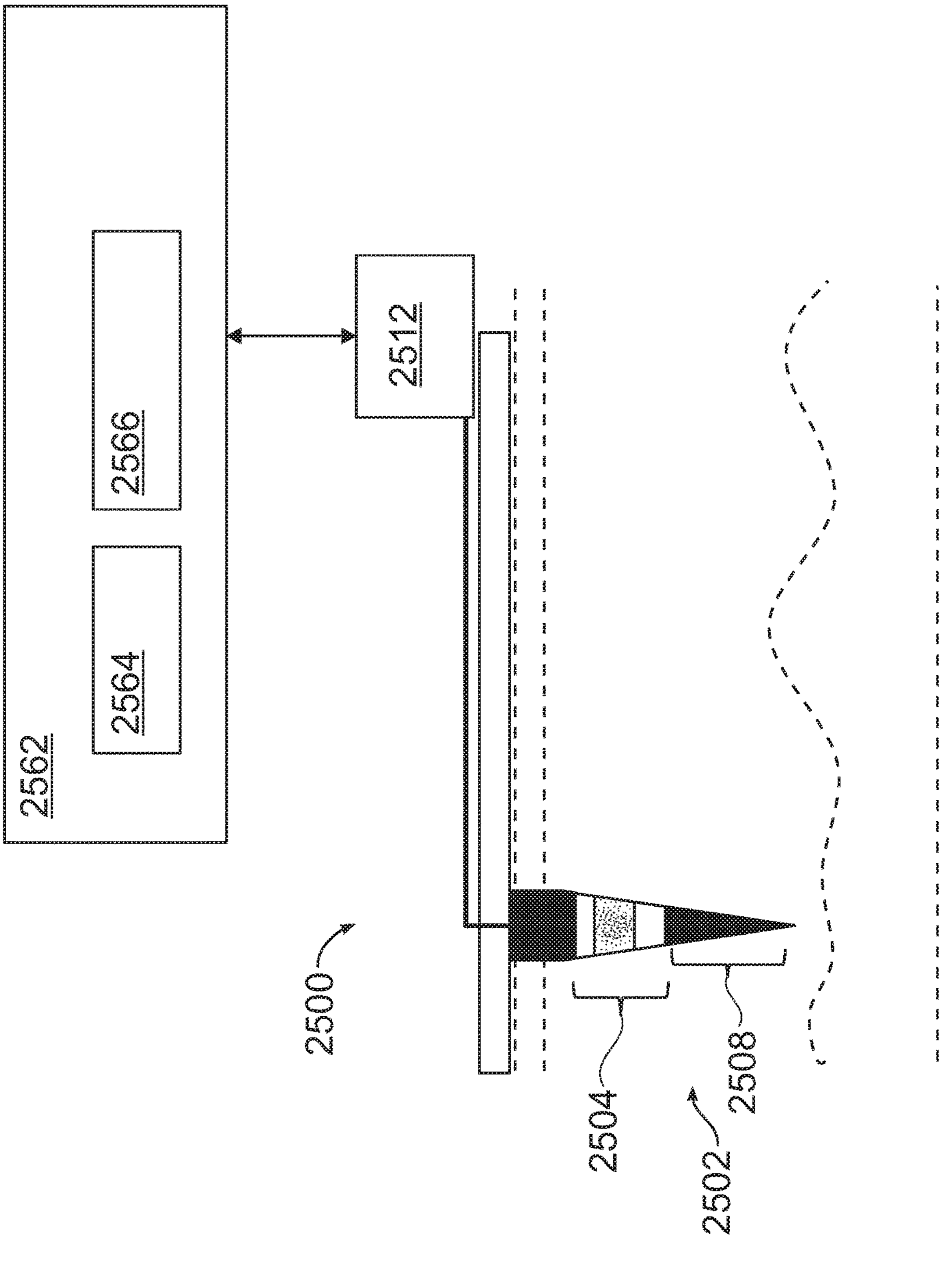
FIG. 25 is a schematic diagram of a microelectrode device for tissue electrotransfer, which incorporates a modeling processor, in accordance with an embodiment of the invention.

FIG. 25 is a schematic diagram of a microelectrode device 2500 for tissue electrotransfer, which incorporates a modeling processor 2562, in accordance with an embodiment of the invention. Here, the modeling processor 2562 includes a modeling module for determining electroporation hotspots by using a multiscale skin electroporation model that incorporates tissue level electric field prediction and a cellular level simulation accounting for the cell density in the targeted tissue. To implement this module, the modeling processor 2562 includes a tissue level electric field prediction module 2564 and a cellular level simulation module 2566. The tissue level electric field prediction module 2564 can, for example, use a model to determine an electric field in the tissue. The cellular level simulation module 2566 can, for example, simulate the cell density within the tissue. Using these modules, the modeling processor 2562 can determine tissue locations to which to selectively deliver, via tissue electrotransfer, a biomolecule to cells located in the tissue location. In addition, using these modules, the modeling processor 2562 can determine a control voltage 2568 delivered by the voltage source 2512 to the penetrating microelectrode 2502. Further, the output of the modeling processor 2562 can be used to determine the locations of the anchor microelectrode region 2508 and target tissue microelectrode region 2504 within the targeted tissue; and to determine the format, spacing and dimensions of the penetrating microelectrodes 2502 used in an array of such penetrating microelectrodes 2502. In addition, the modeling processor 2562 can be used to determine a control voltage delivered by the voltage source to the penetrating microelectrode, regardless of whether the modeling processor 2562 includes a tissue level electric field prediction module 2564 and a cellular level simulation module 2566.

Various techniques set forth herein can include computer implemented components, such as modeling processor 2562, tissue level electric field prediction module 2564 and cellular level simulation module 2566 (see FIG. 25). Such components can be implemented using hardware, and can include one or more processors, which can for example include one or more Application Specific Integrated Circuits (ASICs), application software running on one or more processors; and sensor and/or control connections delivering electronic signals to and from systems set forth herein (such as voltage source 2512 and penetrating microelectrode 2502 of FIG. 25), in which the signals can deliver electronic signals to and from actuated components within components set forth herein. The components can include user input modules, which can include components (such as a keyboard, touch pad, and associated electronics in connection with a processor and a memory) to receive user input. The components, such as modeling processor 2562 and voltage source 2512, can also include a memory to store information, and to implement procedures under control of computer hardware and software. It will be appreciated that other control hardware and software may be used. Techniques can be implemented using hardware, software or a combination thereof. When implemented in software, the software code can be executed on any suitable processor or collection of processors, whether provided in a single computer or distributed among multiple computers.

Figure 12:
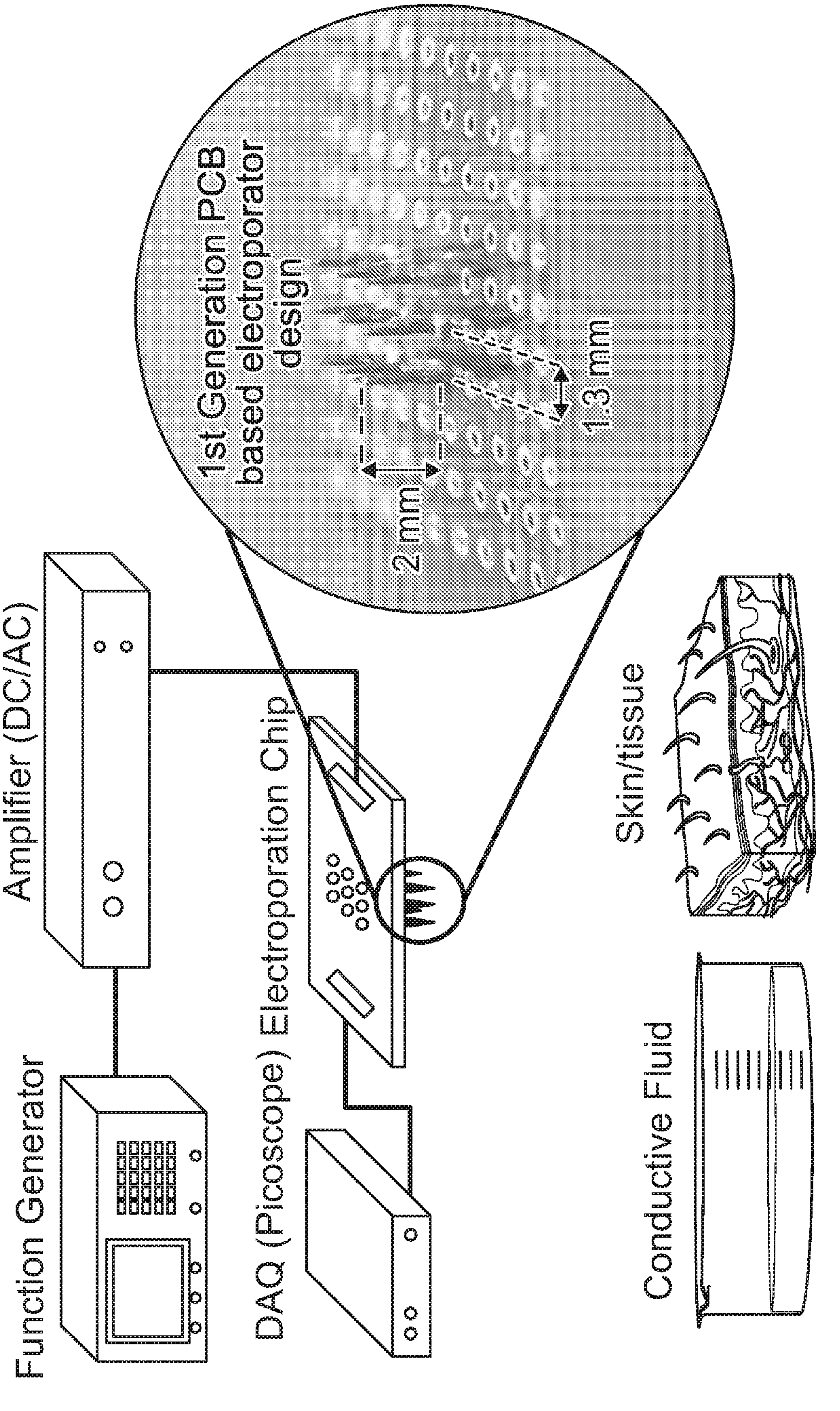
FIG. 12 is a schematic diagram of an electrical system schematic used with a penetrating microelectrode array, in an experiment in accordance with an embodiment of the invention.

FIG. 12 is a schematic diagram of an electrical system schematic used with a penetrating microelectrode array, in an experiment in accordance with an embodiment of the invention. In this experiment, electrical characterizations were performed in both conductive fluid and skin tissue. The schematic includes a function generator, amplifier and electroporation chip. Here, the penetrating microelectrodes are needles mounted to a printed circuit board, and are of length 2 mm with center-to-center spacing of 1.3 mm.

Figure 13:
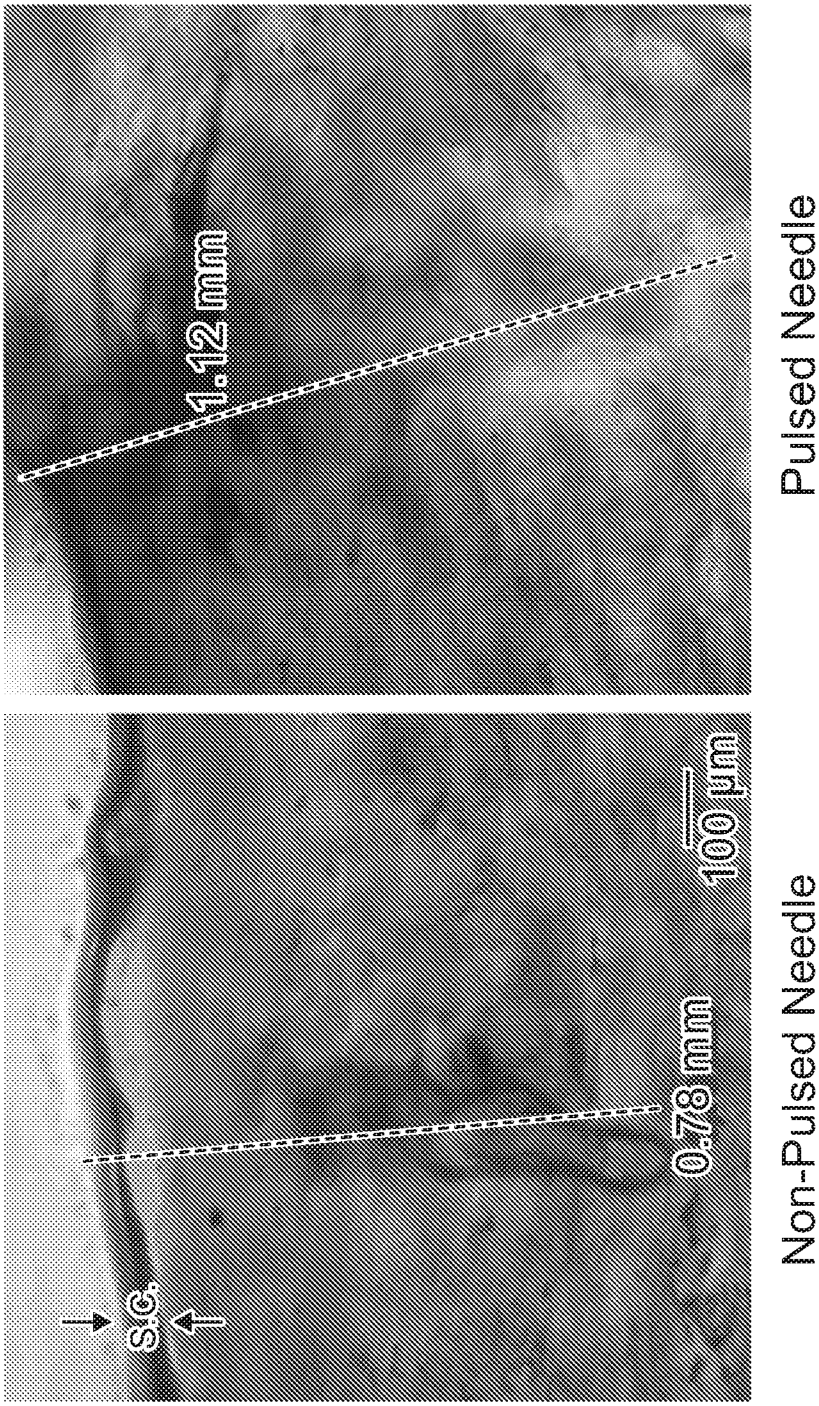
FIG. 13 is a diagram showing images of the results of electropermeabilization testing with rhodamine, in an experiment in accordance with an embodiment of the invention.

FIG. 13 is a diagram showing images of the results of electropermeabilization testing with rhodamine, in an experiment in accordance with an embodiment of the invention. In this experiment, a 1.5 kV/cm, 10 msec DC pulse was applied. A needle length of 3 mm was used. The stratum corneum layer was overcome with pulsation. The image shows bright field and red channel images merged. Results with a nonpulsed needle are at left, and with a pulsed needle are at right.

Figure 14:
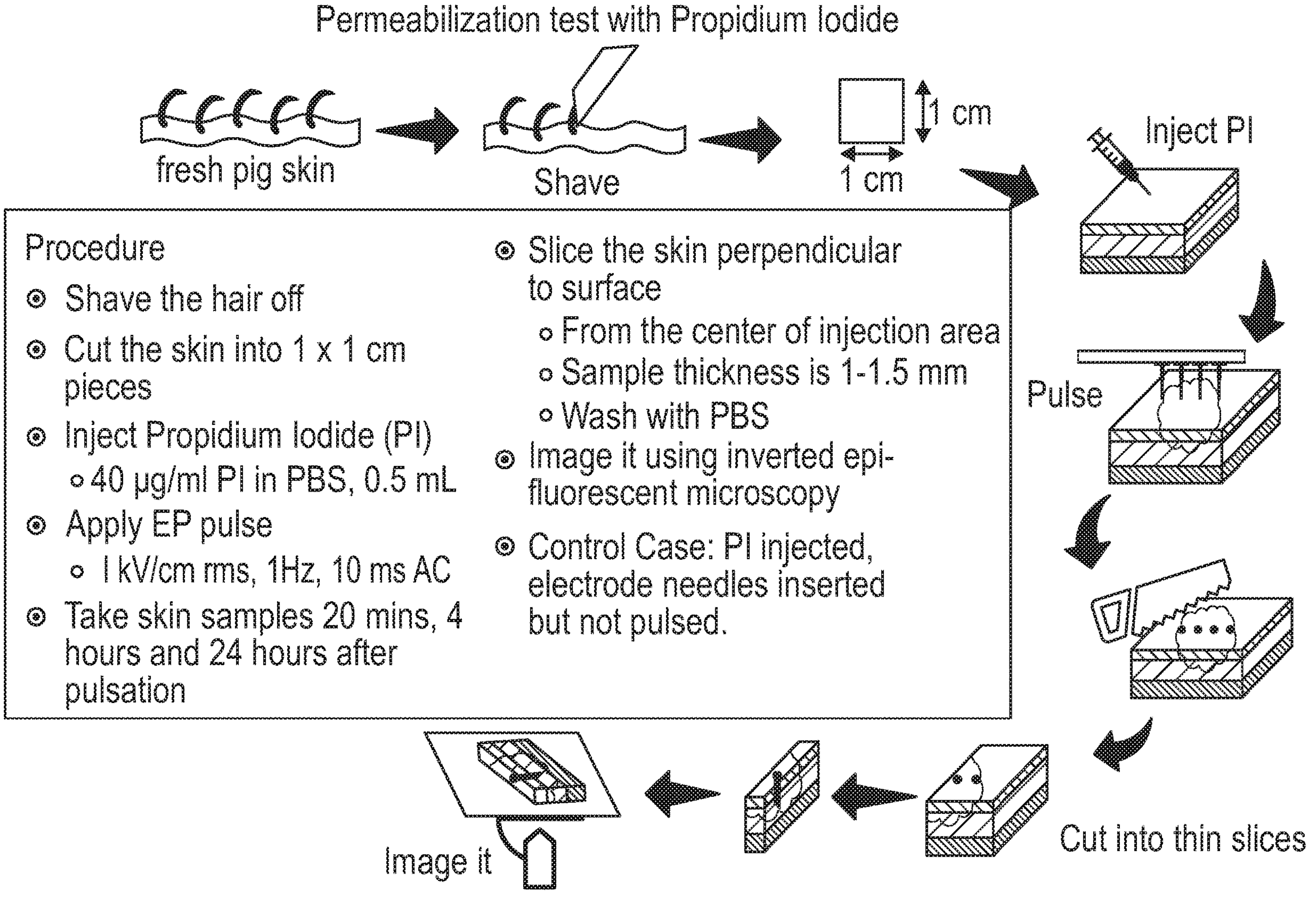
FIG. 14 is a summary of a protocol used for a permeabilization test with propidium iodide, in an experiment in accordance with an embodiment of the invention.

FIG. 14 is a summary of a protocol used for a permeabilization test with propidium iodide, in an experiment in accordance with an embodiment of the invention.

Figure 15:
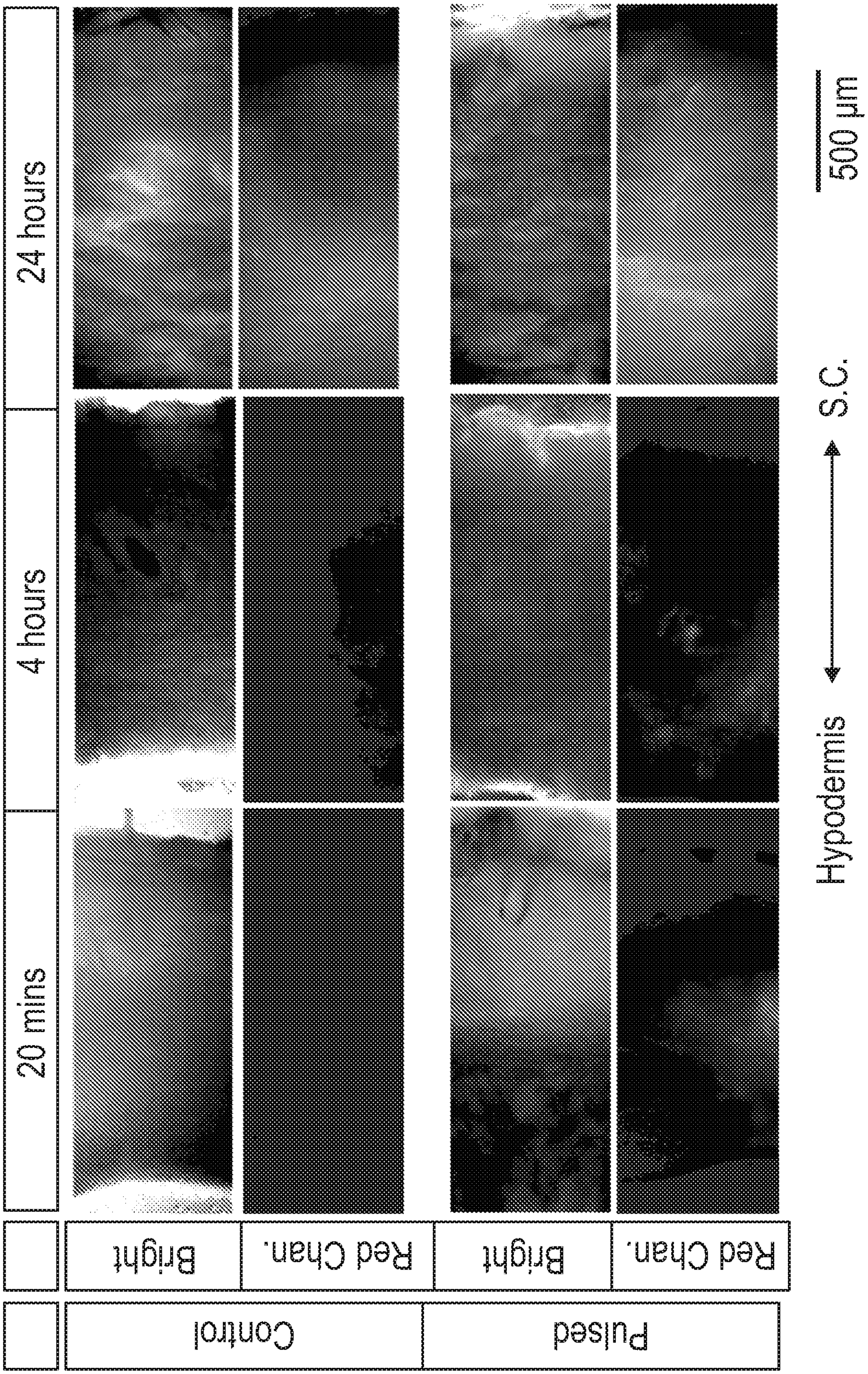
FIG. 15 is a diagram showing images of sectioned skin image examples, in the experiment of FIG. 14.

FIG. 15 is a diagram showing images of sectioned skin image examples, in the experiment of FIG. 14.

Figure 16:
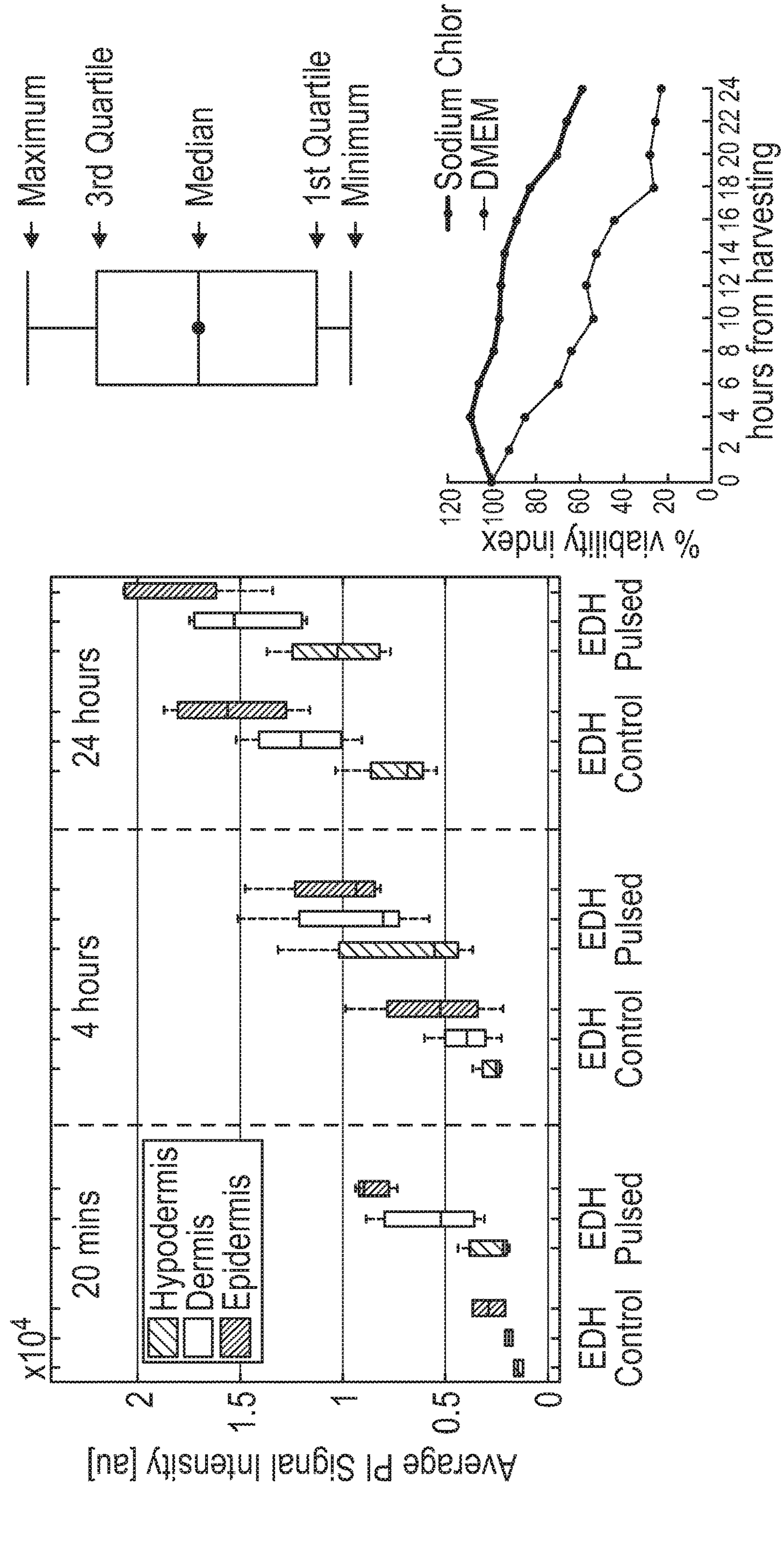
FIG. 16 is a diagram showing image analysis results in the experiment of FIG. 14.

FIG. 16 is a diagram showing image analysis results in the experiment of FIG. 14. A graph at lower right is from Ge et al., 2010, "The viability change of pigskin in vitro," *Burns*, 36 (2010).

Figure 17:
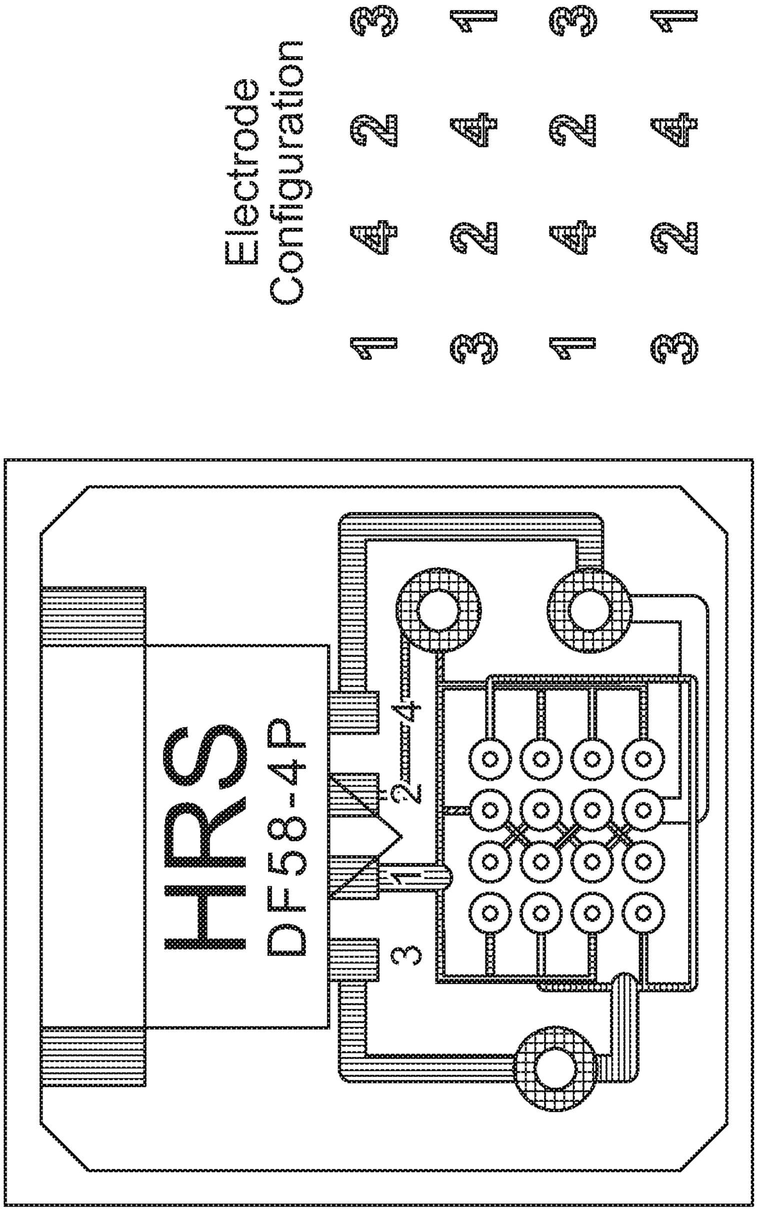
FIG. 17 is a schematic diagram of an electrode configuration of a penetrating microelectrode array in which multiple electrodes are addressed as a group, in accordance with an embodiment of the invention.

FIG. 17 is a schematic diagram of an electrode configuration of a penetrating microelectrode array in which multiple electrodes are addressed as a group, in accordance with an embodiment of the invention. In this example, electrodes labeled "1" are addressed as a group, as are electrodes labeled "2," "3" and "4." It will be appreciated that other arrangements can be used, and that individually addressable electrodes can be used. As shown in this figure, the microelectrode device can comprise more than one of the penetrating microelectrode, and the electrical connection can comprise an electrically independent connection to two or more of the more than one penetrating microelectrodes.

Figure 18:
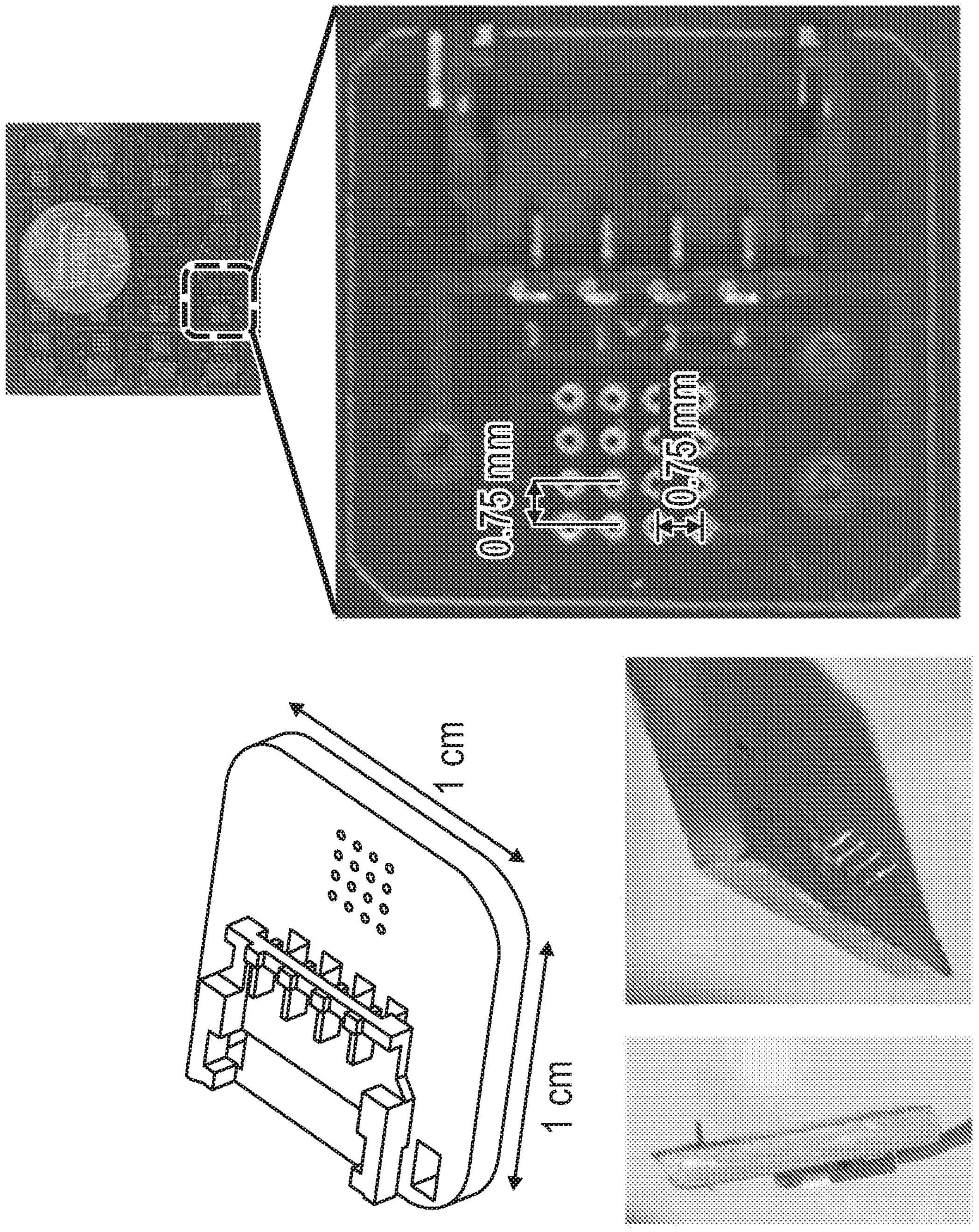
FIG. 18 is a diagram showing a penetrating microelectrode array device using a printed circuit board to provide electrical connections, in accordance with an embodiment of the invention.

FIG. 18 is a diagram showing a penetrating microelectrode array device using a printed circuit board to provide electrical connections, in accordance with an embodiment of the invention.

Figure 19:
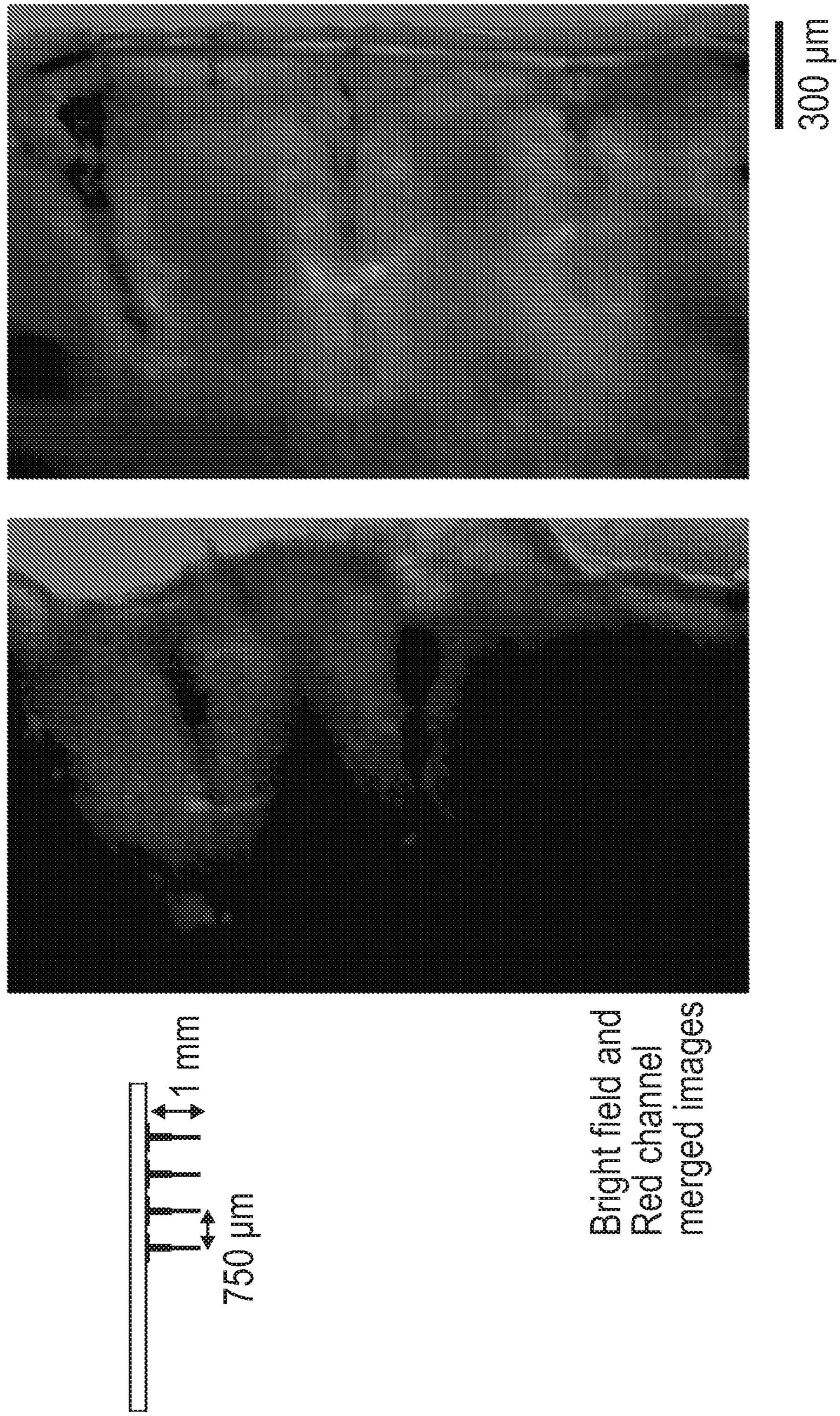
FIG. 19 is a diagram showing images of the results of testing a penetrating microelectrode array device using a printed circuit board, in an experiment in accordance with an embodiment of the invention.

FIG. 19 is a diagram showing images of the results of testing a penetrating microelectrode array device using a printed circuit board, in an experiment in accordance with an embodiment of the invention. "Hotspots" of propidium iodide can be seen around the needle insertion site.

Figure 20:
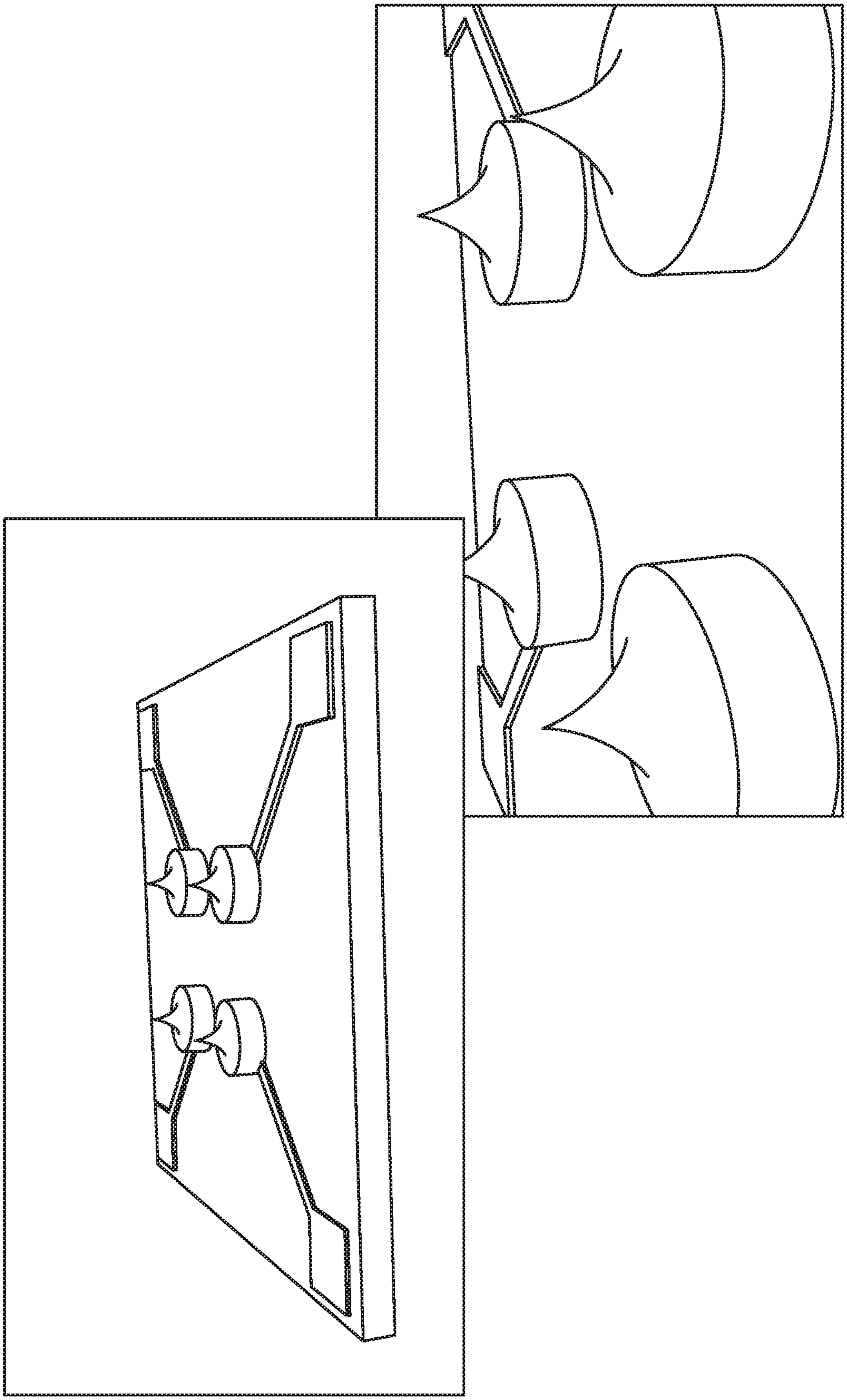
FIG. 20 is a schematic diagram of penetrating microelectrode arrays fabricated using photolithography, in accordance with an embodiment of the invention.
Figure 21:
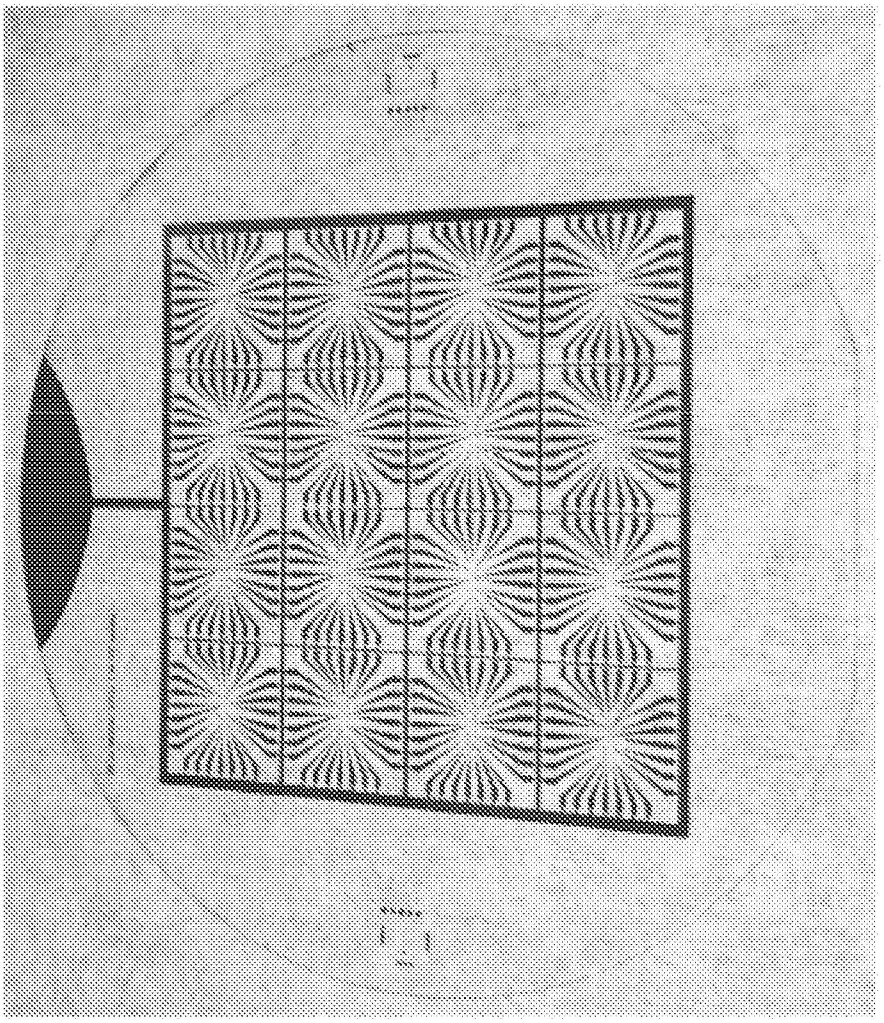
FIG. 21 is an image of dies on a wafer used for fabricating penetrating microelectrode arrays using photolithography, in accordance with an embodiment of the invention.

FIG. 20 is a schematic diagram of penetrating microelectrode arrays fabricated using photolithography, in accordance with an embodiment of the invention. As shown in this figure, the electrical connection can comprise a connection defined by photolithography, the penetrating microelectrode can comprise an electrode base defined by photolithography, and the penetrating microelectrode can comprise electroplated metal. In one example, penetrating microelectrode arrays can be fabricated using UV LiGA techniques, where "LiGA" is from the German acronym signifying Lithography, Electroplating and Molding. Photolithography can be used to define traces, penetrating microelectrode bases, mold for electroplating. Electroplating of metal can be used to create solid posts. Electrochemical or wet etch can be used to define the shape of penetrating microelectrodes. This can be followed by removal of molding material, and dicing of a wafer to create separate chips. FIG. 21 is an image of dies on a wafer used for fabricating penetrating microelectrode arrays using photolithography, in accordance with an embodiment of the invention.

An embodiment according to the invention uses selective insulation of a penetrating microelectrode and coating the penetrating microelectrode with DNA vector (or other biomolecule) in order to deliver the vector and low intensity electric pulses to coincident "hotspot" areas adjacent to the electrode. Since an embodiment focuses on only transfecting the tissue adjacent to the electrodes within the electric field "hotspots," as opposed to attempting to transfect a large tissue volume, a lower pulse field intensity can be used for efficient epidermal and dermal gene electrotransfer (GET), or other biomolecule delivery. It is believed that the approach can overcome many of the major bottlenecks towards clinical translation of transdermal electroporation by addressing the issues of safety, tolerability and efficacy in GET by more efficiently delivering vector and electrical energy to "hotspots" such that there is derived a lower threshold for skin EP, vector delivery is targeted directly to the portion of skin to be permeabilized, and targeted dermal layer transfection is obtained. These benefits combined with impedance monitoring of the skin prior to and following pulse application will allow the penetrating microelectrode array to obtain maximum DNA delivery (or other biomolecule delivery) and GET expression while minimizing tissue irritation from both electrode insertion as well as pulse protocols.

An embodiment according to the invention contrasts with other penetrating electroporation platforms where a vector or other biomolecule is injected under the skin in a less controlled fashion, and long, deeply penetrating electrodes are used so that a portion of the electrodes are below the skin. These approaches also use higher intensity pulses to permeabilize the largest volume of tissue around the electrodes. The vector injection means a large amount of vector is distributed in the tissue in areas which are not efficiently permeabilized and the deep electrode penetration coupled with high intensity pulses causes ablative irreversible electroporation tissue damage adjacent to the electrodes. This leads to variability in GET transfection efficacy as well as adverse tissue damage. Clinical protocols for administration site selection, electrode design, and pulse parameters must be carefully evaluated for safety, tolerability and efficacy. (20, 40, 41) In particular, an embodiment according to the invention targets the viable epidermis due to the high concentration of keratinocytes and dendritic cells which can be activated via GET.

In other embodiments, selective epidermal and dermal targeting of vector delivery and transfection may also be used in other clinical regimes such as electrochemotherapy (ECT), non-thermal irreversible electroporation (N-TIRE) or focused transfection of tissues other than skin. It will be appreciated that other biomolecule deliveries can be performed.

Figure 5:
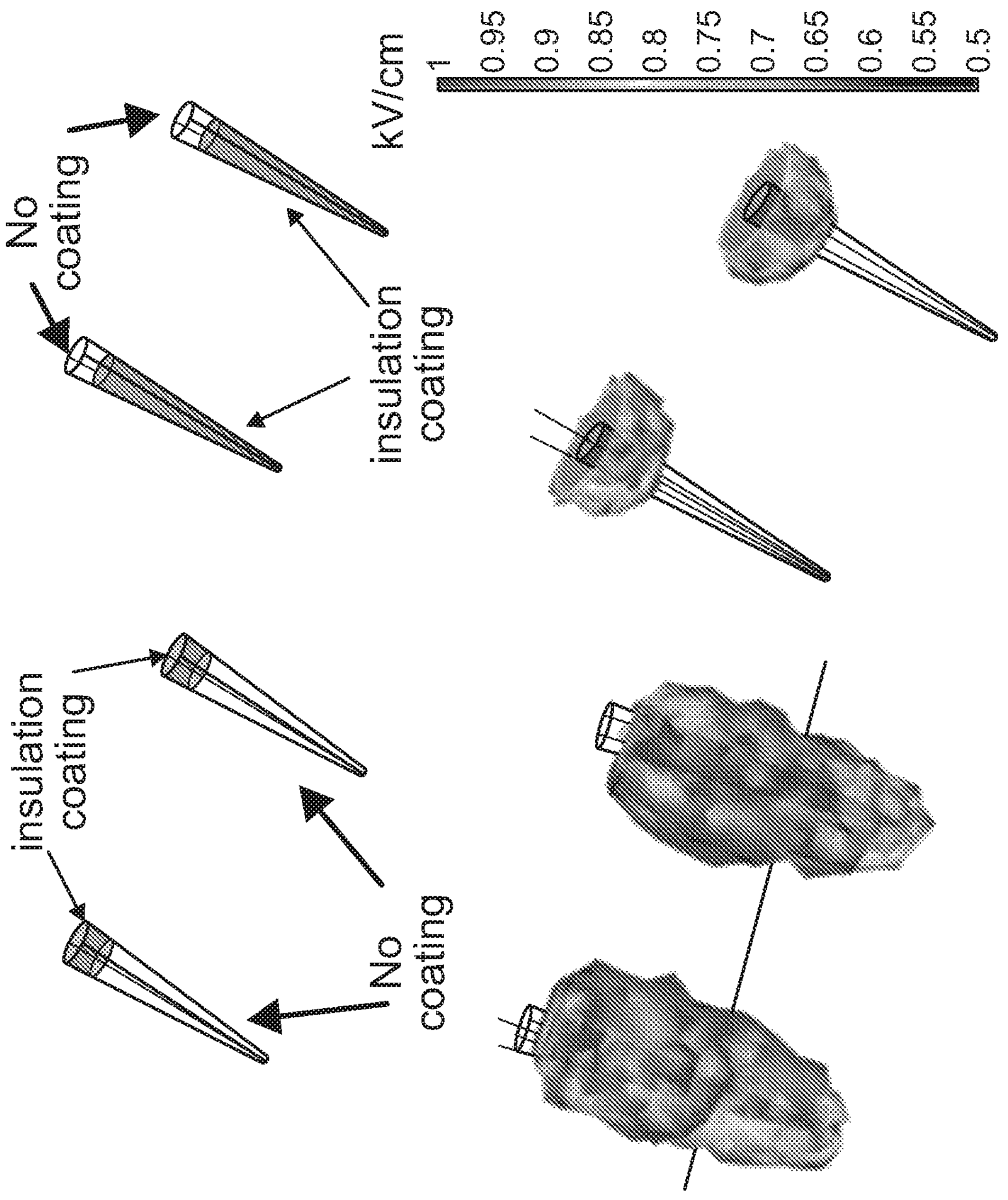
FIG. 5 is a diagram illustrating selective electrical insulation of penetrating microelectrodes on a base and a tip of the microelectrode, and showing the results of simulations of localized electric field strengths produced by the microelectrodes for targeted tissue electrotransfer, in accordance with an embodiment of the invention.

FIG. 5 is a diagram illustrating selective electrical insulation of penetrating microelectrodes on a base and a tip of the microelectrode, and showing the results of simulations of localized electric field strengths produced by the microelectrodes for targeted tissue electrotransfer, in accordance with an embodiment of the invention. In the embodiment of FIG. 5, penetrating microelectrodes are selectively insulated, in order to focus tissue "hotspots" to distinct dermal layers. Controlled, low-voltage electroporation is then targeted to specific dermal layers using selective insulation over regions of the penetrating microelectrodes. In order to accomplish this goal, in one experiment in accordance with an embodiment of the invention, penetrating microelectrode arrays are coated via chemical vapor deposition (CVD) of a parylene (poly(p-xylylene)) film. In parylene CVD, a known mass of solid parylene dimers are sublimed into the gas phase where they are then pyrolyzed to cleave the dimer into monomer molecules. The parylene monomers are then introduced into the deposition chamber where they polymerize and conformally coat the exposed penetrating microelectrode array surface. Parylene is a USP Class VI Polymer known for its biological inertness and has been used for decades as an encapsulation material for medical devices and medical electronics. A 100-1000 nm thick insulating parylene layer is deposited on the penetrating microelectrode array. The parylene is selectively removed from either the base or tip of the penetrating microelectrodes via mechanical abrasion or focused $CO_2$ excimer laser ablation for more accurate removal. These penetrating microelectrodes are then coated with a pDNA solution stabilized in a 1% (w/v) carboxy-methylcellulose and 0.5% (w/v) Lutrol F-68 NF (BASF, Mt. Olive, NJ, USA) solution as previously reported for an expected 0.15-15 μg DNA coated per needle. It will be appreciated that other coating techniques, including alternative coating techniques which have been used for coating microneedles, such as inkjet printing or electrospraying, may also be utilized; and that other biomolecules can be used.

FIG. 5 also shows simulation results, in accordance with an embodiment of the invention, which predict the effect of selectively insulating the penetrating microelectrodes and localizing 'hotspots' in either the dermis or epidermis. It can be accurately predicted where skin electroporation will occur at varying applied voltages so one can target DNA vector gene electrotransfer (GET) (or other biomolecule delivery) at distinct layers of the skin while minimizing tissue damage. By focusing the hotspot to either the dermal or epidermal skin layers, it is expected that epidermal transfection will demonstrate a higher degree of transfection due to the higher epidermal cell density, which will help to ensure that DNA based vaccines have sufficient expression for dendritic cell activation to confer a protective immunological response. Similar advantages may be able to be achieved with other biomolecule deliveries.

An embodiment according to the invention provides a minimally invasive penetrating microelectrode array to localize delivery of DNA (or other biomolecules, such as nucleic acids or proteins) and electric field hotspots around the electrodes. In experiments in accordance with an embodiment of the invention, the penetrating electrode dimensions and spacing are informed by the development of a skin electroporation model which can predict both electric field distribution above an electroporation threshold within skin as well as a packed cell model which can predict how electroporation of cells within tissue then changes the electric field distribution within the rest of the tissue. By coating high concentrations of pDNA vectors (or other biomolecules) directly onto the penetrating microelectrode array, the DNA is locally reconstituted in tissue adjacent to the electrode surface following insertion so that vectors and electrical energy are delivered to their desired "hotspot" locations within the skin to obtain targeted tissue transfection.

An embodiment according to the invention provides selective insulation of penetrating microelectrodes for targeted skin electroporation. By depositing an insulating polymer onto the penetrating microelectrode surface and selectively removing the insulation over part of the penetrating microelectrode (e.g., tip vs. base) portions of the penetrating microelectrodes can be insulated so that vectors and electrical energy are delivered to their desired "hotspot" locations within the skin to obtain targeted skin layer transfection.

Experiments, constructed in accordance with an embodiment of the invention and described herein, employ a multifaceted approach to improving dermal electroporation efficiencies through computational modeling of electric field distributions within a skin model from different penetrating electrode geometries, computational modeling of permeabilization distribution within a packed cell tissue model, development of a penetrating microelectrode array, selective insulation of the penetrating microelectrodes, and DNA vector coating of the penetrating microelectrode array to co-target vector delivery and electrical pulse energy to distinct dermal layers.

Experimental #1

Figure 7:
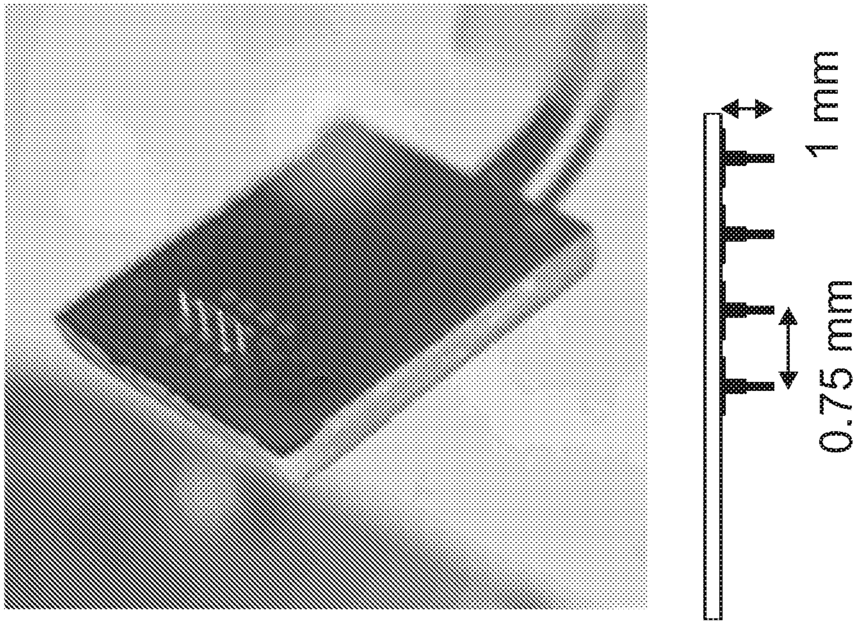
FIG. 7 is a diagram showing a photograph and a schematic diagram of a penetrating microelectrode array, in accordance with an embodiment of the invention.

FIG. 7 is a diagram showing a photograph and a schematic diagram of a penetrating microelectrode array, in accordance with an embodiment of the invention. In an experiment in accordance with an embodiment of the invention, with reference to FIG. 7, there was developed a penetrating microelectrode array which consists of austenitic 316 stainless surgical steel acupuncture needles assembled into a printed circuit board (PCB) array. Each penetrating microelectrode is a 160 μm diameter needle which tapers to a fine point over a 745 μm tip length at a 6.129° taper angle. Each needle is placed into the PCB through a plated through-hole with the penetration length of the penetrating microelectrode controlled using a plastic silicone rubber spacer of known thickness which the electrode pierces. The total penetration depth of the penetrating microelectrode array is controlled by the exposed penetrating microelectrode length which can be as short as ¼ mm. Following penetrating microelectrode assembly, the backs of the needles are clipped and then soldered to the PCB via dip soldering within a solder bath. The PCB is connected to a ribbon cable for electrical excitation. The prototype penetrating microelectrode array supports 16 electrodes with a 0.75 mm center to center spacing and typically protrude 1 mm as shown in FIG. 7. The penetrating microelectrode array design is informed by the development of a multiscale skin electroporation model which links a tissue level electric field prediction and a cellular level simulation accounting for the cell density in the dermis and epidermis to an electroporation circuit model to identify "hotspots" around electrodes where electroporation is simulated. This multiscale model helps inform penetrating microelectrode array design and implementation to determine optimal penetrating microelectrode array geometry and pulse parameters. Such a multiscale model can, for example, be implemented by a modeling processor described relative to FIG. 25, herein.

Experimental #2

Figure 8:
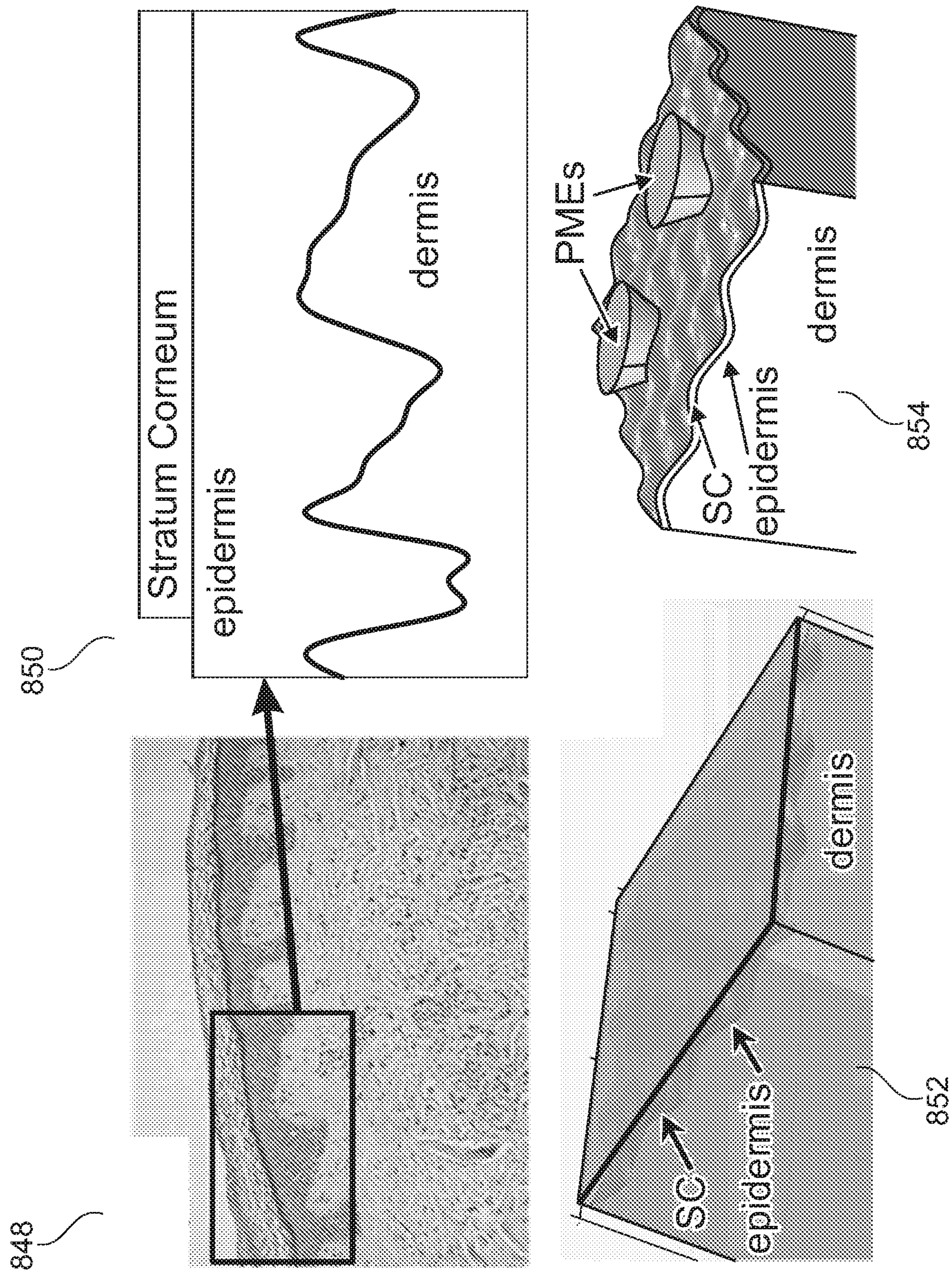
FIG. 8 is a diagram showing views of the stratum corneum, epidermis and dermis layers of skin, and of penetrating microelectrodes inserted in those layers, in accordance with an embodiment of the invention.

FIG. 8 is a diagram showing views of the stratum corneum, epidermis and dermis layers of skin, and of penetrating microelectrodes inserted in those layers, in accordance with an embodiment of the invention. In an experimental investigation conducted in accordance with an embodiment of the invention, with reference to FIG. 8, there was developed a computational skin tissue level model where the skin morphology was extracted from histological images to delineate the dermal-epidermal junction (DEJ) with a realistic surface topography and epidermal thickness. In FIG. 8, image 848 shows H&E stained skin delineating the DEJ; image 850 shows the epidermal thickness extracted into a 2D skin model; image 852 shows a 2D model extruded into a 3D skin model with periodic ridges; and image 854 shows a 3D skin model with wavy surface extracted from skin histology. A pair of inserted penetrating microelectrodes are shown in image 854. Physical properties (thickness, conductivity, etc.) used in the simulation were found in literature (28, 42). This global skin model is used to determine the electric field distribution within tissue to identify where a permeabilizing field intensity threshold of 0.5 kV/cm is achieved. Using this model the electric field distribution within the skin was simulated using surface electrodes where all of the permeabilizing electric field was localized within the stratum corneum at an applied 20 V and only penetrated into the dermal layers at voltages of 50 V and above. The simulation was updated to reflect the increase in stratum corneum (SC) conductivity when a permeabilizing threshold was achieved. This required a voltage of 100 V and deeper field penetration into the skin but is not a controllable process during experiments. Therefore, it was decided to focus on a penetrating microelectrode design.

Experimental #3

Figure 9:
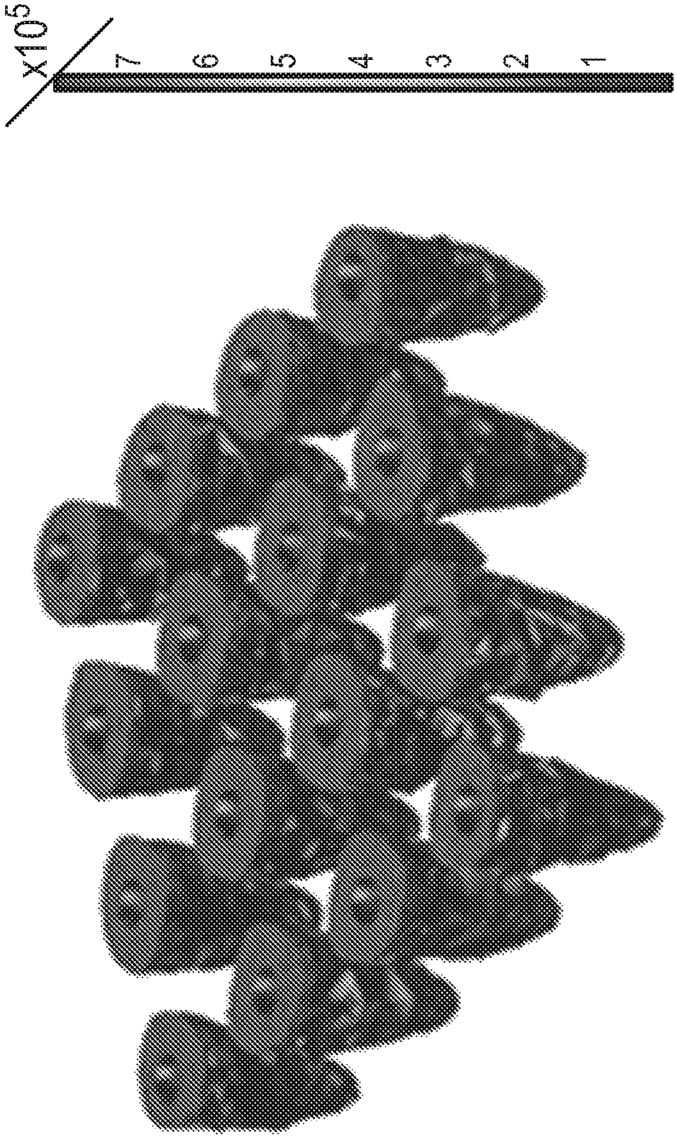
FIG. 9 is a diagram showing the results of simulation of localized electric field strengths surrounding an array of sixteen penetrating microelectrodes inserted into a skin model, in a simulation in accordance with an embodiment of the invention.

FIG. 9 is a diagram showing the results of simulation of localized electric field strengths surrounding an array of sixteen penetrating microelectrodes inserted into a skin model, in a simulation in accordance with an embodiment of the invention. When using penetrating microelectrodes the simulation can predict "hotspots" around the electrodes as shown in FIG. 9. The simulation can predict the electric field distribution around simulated needles, varying the needle spacing, insertion depth and applied voltage. FIG. 9 shows the results of one such simulation by delineating the volume around the electrodes where the electric field exceeds a value of 0.5 kV/cm, the minimum electric field expected for tissue electroporation. In particular, the electric field increases at the tips of the penetrating microelectrodes due to the sharp tips which focuses electric field lines with decreasing electrode area. In this manner, successive iterations of a penetrating microelectrode array can be rationally designed as required.

Experimental #4

Figure 10:
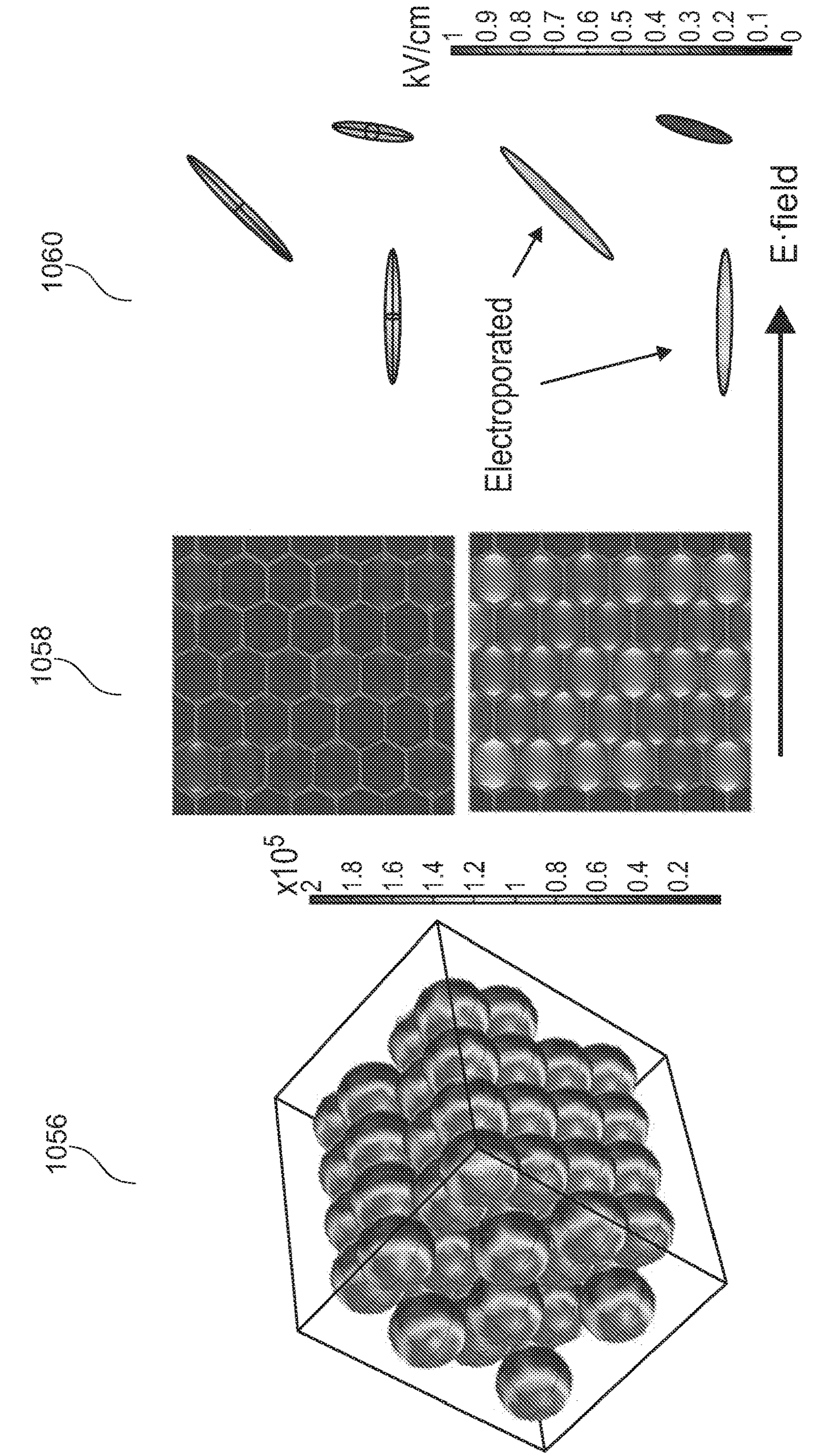
FIG. 10 is a diagram showing, in a simulation in accordance with an embodiment of the invention, a packed cell model 1056 of epidermal keratinocytes at an applied field of 2.0 kV/cm; a 2D projection 1058 of the packed cell model at a field of (Top) 0.83 kV/cm showing a partially electroporated state and (bottom) 1.0 kV/cm showing a fully electroporated state; and an image 1060 of (Top) transmembrane potential and (Bottom) electric field within simulated dermal fibroblasts showing orientation dependent electroporation.

In addition to a tissue level model, a local packed cell model has been developed, in an experiment in accordance with an embodiment of the invention, to understand how permeabilization occurs in different layers of the skin. This local model couples the simulated electric potential to a local equivalent circuit model of a cell in which the cell membrane is treated as a capacitor in parallel with a resistor where the conductance drops significantly in the tissue during electroporation when a transmembrane voltage (TMV) of 0.5 V is achieved. The field distribution is then updated to reflect this drop in local cell impedance to indicate how the influence of one cell undergoing electroporation influences the TMV (and hence propensity towards electroporation) of its neighbors. Two models have been developed. The first is a packed sphere model 1056 reflecting the high keratinocyte density found in the epidermis. FIG. 10 is a diagram showing, in a simulation in accordance with an embodiment of the invention, a packed cell model 1056 of epidermal keratinocytes at an applied field of 2.0 kV/cm. Images 1058 are 2D projections of model 1056 at a field of (Top) 0.83 kV/cm showing a partially electroporated state and (bottom) 1.0 kV/cm showing a fully electroporated state. Image 1060 (Top) shows transmembrane potential and (Bottom) shows electric field within simulated dermal fibroblasts showing orientation dependent electroporation. As shown in image 1056 of FIG. 10, when a high intensity electric field is applied all cells are fully electroporated. Image 1058 of FIG. 10 shows a 2D centerline projection of the packed cells at moderate to high applied electric field reflecting partially to fully electroporated condition. In the partially electroporated condition the permeabilization of one cell can increase the local potential of its neighbor. Image 1060 of FIG. 10 shows a lower cell density simulation of elliptical cells in various orientations reflecting the cell density and distribution of dermal fibroblasts (43). Aside from a lower cell density, the simulation shows that the degree of electroporation strongly correlates with cell orientation with cells aligned with the electric field having a greater degree of electroporation. These simulations lead to a hypothesis that targeted electroporation within the epidermis will lead to a greater degree of cell electroporation due to the higher cell density and less orientation dependent effects. These simulations can also be used to guide penetrating microelectrode array design and optimize pulse parameters. It can be accurately predicted where skin electroporation will occur at varying applied voltages so that one can target DNA vector GET (or other biomolecule delivery) at distinct layers of the skin while minimizing tissue damage. Electroporation can be targeted to specific dermal layers using selective insulation over regions of the penetrating microelectrodes. Such simulations, and the consequent control, design, and optimization can be performed using a modeling processor, such as that described in connection with FIG. 25, herein.

Experiment #5

Figure 6:
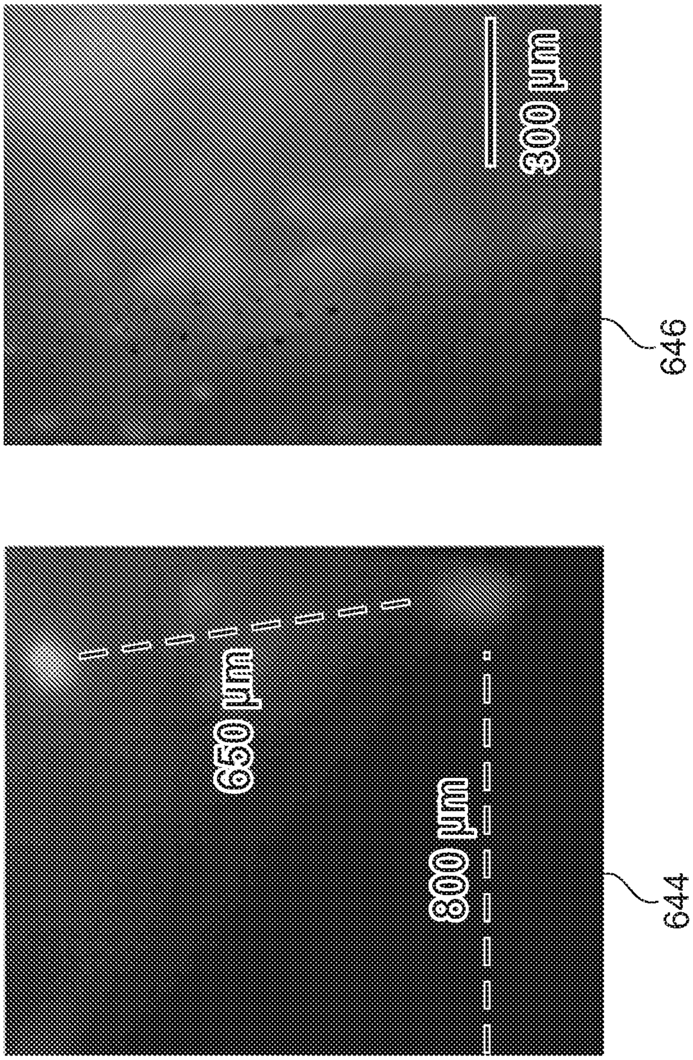
FIG. 6 is a diagram showing images of Green Fluorescent Protein (GFP) expression in porcine skins following intradermal injection and application of direct current pulses, in experiments in accordance with an embodiment of the invention.

In another experiment in accordance with an embodiment of the invention, studies of Green Fluorescent Protein (GFP) expression in porcine skin were performed, which will be discussed with reference to FIG. 6. These studies were performed under protocols approved by Rutgers IACUC committee (PROTO201702610—Porcine skin harvesting). Skin was freshly harvested from euthanized 3 to 5-week-old piglets, carefully cleaned with 70% ethanol, and then shaved and depilated. The skin tissue was cut into small square pieces approximately 1×1 cm. The subcutaneous fat and tissue were removed carefully by a scalpel. 20 μg/ml pEGFP-N1 vector (Clontech) in 1×PBS solution was injected by MicronJet600 microneedles (NanoPass Technologies Ltd., Nes Ziona, Israel) before the electroporation treatment. Electric pulses were applied by using the preliminary penetrating microelectrode array. The GFP pDNA was injected via shallow ID microneedle injection followed by a 5V or 50V 10 ms electroporation pulse. Following electroporation treatment, the skin samples were immediately put into a modified Eagle's medium (MEM) at 37° C. on a rocker in an incubator. At a chosen time point (8, 16, 24, and 48 hours post-pulsation), the skin samples were sliced along the transverse plane from the center of injection site and then washed with PBS. The slices were 1-1.5 mm thick and imaged by using inverted epi-fluorescent microscopy. FIG. 6 shows Green Fluorescent Protein (GFP) expression at 24 hours localized with the tips of penetrating microelectrodes demonstrated in the freshly excised porcine skin. GFP expression is shown in the porcine skin following intradermal ID injection and, in panel 644, 5V, 10 ms DC pulse and, in panel 646, 50V, 10 ms DC pulse. In panel 644, the GFP expression is localized at the needle tips 800 μm from the skin surface and spaced 650 μm apart consistent with the penetrating microelectrode array dimensions (1000 μm long, 750 μm apart). The 5V pulse in panel 644) shows localization at the penetrating microelectrode tip 'hotspot' where the field is expected to be highest due to the sharp penetrating microelectrode tips whereas the 50V pulse in panel 646 shows a more diffuse tissue fluorescence.

Experiment #6

Figure 11:
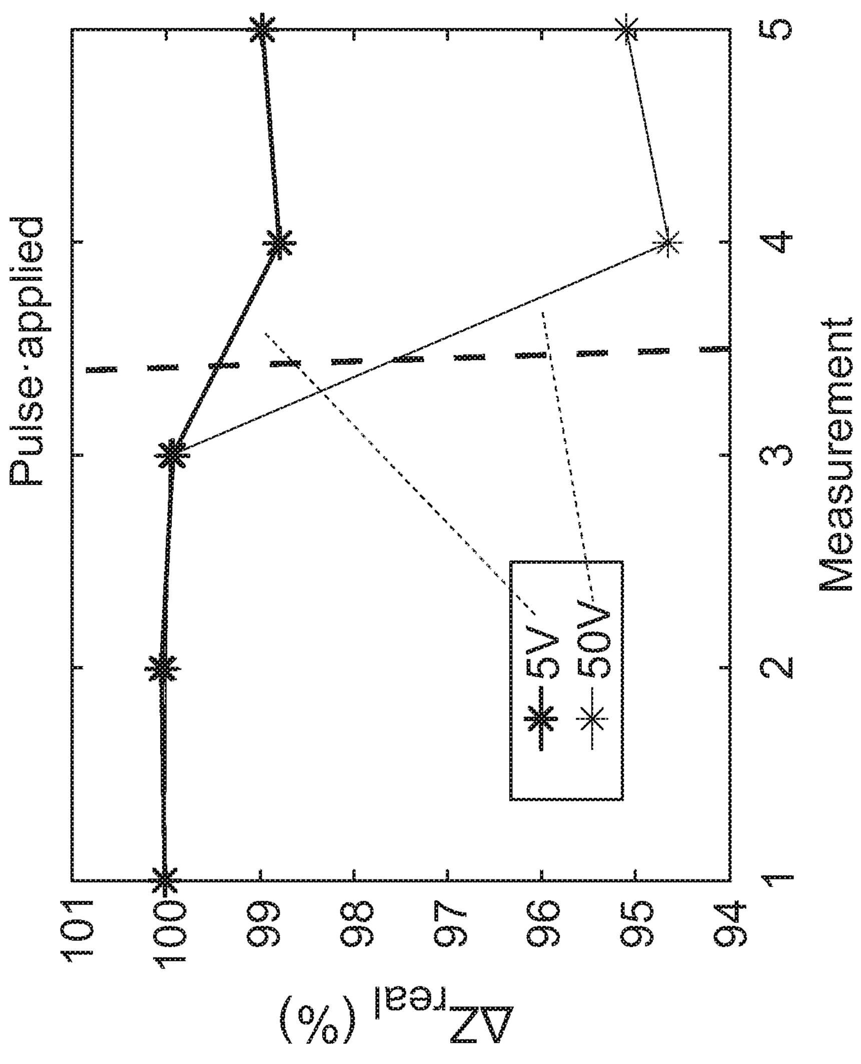
FIG. 11 is a graph showing a change of tissue impedance in measurements before and after application of a pulsed electroporation voltage to a penetrating microelectrode, in an experiment in accordance with an embodiment of the invention.

Additionally, the degree of tissue electroporation can be monitored by a drop in tissue impedance as cells are permeabilized and, in experiments in accordance with an embodiment of the invention, there has been seen evidence of tissue level electroporation at voltages as low as 5V (FIG. 6, panel 644). FIG. 11 shows excised porcine skin impedance before and following electroporation pulse application, in experiments in accordance with an embodiment of the invention. By monitoring the tissue impedance the degree of tissue electroporation can be assessed and the impedance change can be correlated with pDNA expression (or with expression or other phenomena related to other biomolecules delivered) and tissue damage. In FIG. 11, successive tissue impedance measurements prior to (measurements 1-3) and following (measurements 4-5) either a 5V or 50V 10 ms electroporation pulse. The 5V pulse shows a 1% change in tissue impedance whereas the 50V pulse shows a 5% drop.

Experiment #7

Figure 23:
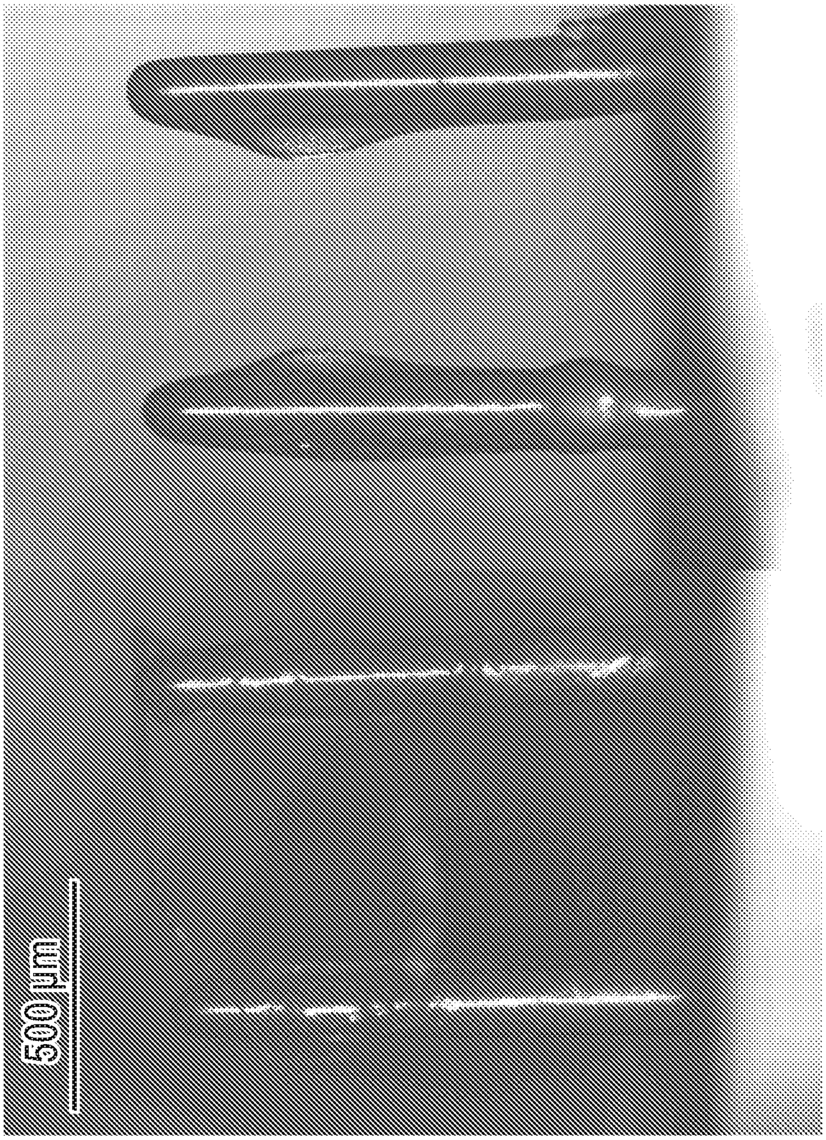
FIG. 23 is an image of DNA composites deposited onto penetrating microelectrode arrays by electrostatic spray, in accordance with an embodiment of the invention.

FIG. 23 is an image of DNA composites deposited onto penetrating microelectrode arrays by electrostatic spray, in experiments in accordance with an embodiment of the invention. This illustrates an example of a biomolecule coating, comprising the biomolecule to be selectively delivered, on at least part of a surface of the target tissue microelectrode region of a microelectrode device. Electrostatic spray was employed for depositing DNA composites onto the penetrating microelectrode arrays, which are here implemented as needle microarrays. GFP DNA plasmid was prepared in solution and then sprayed out of a needle held at high voltage to the grounded microarray. The composited microscope image shows the needles after 20 min of spray at a flow rate of 0.1 mL/hr.

Experiment #8

Figure 24:
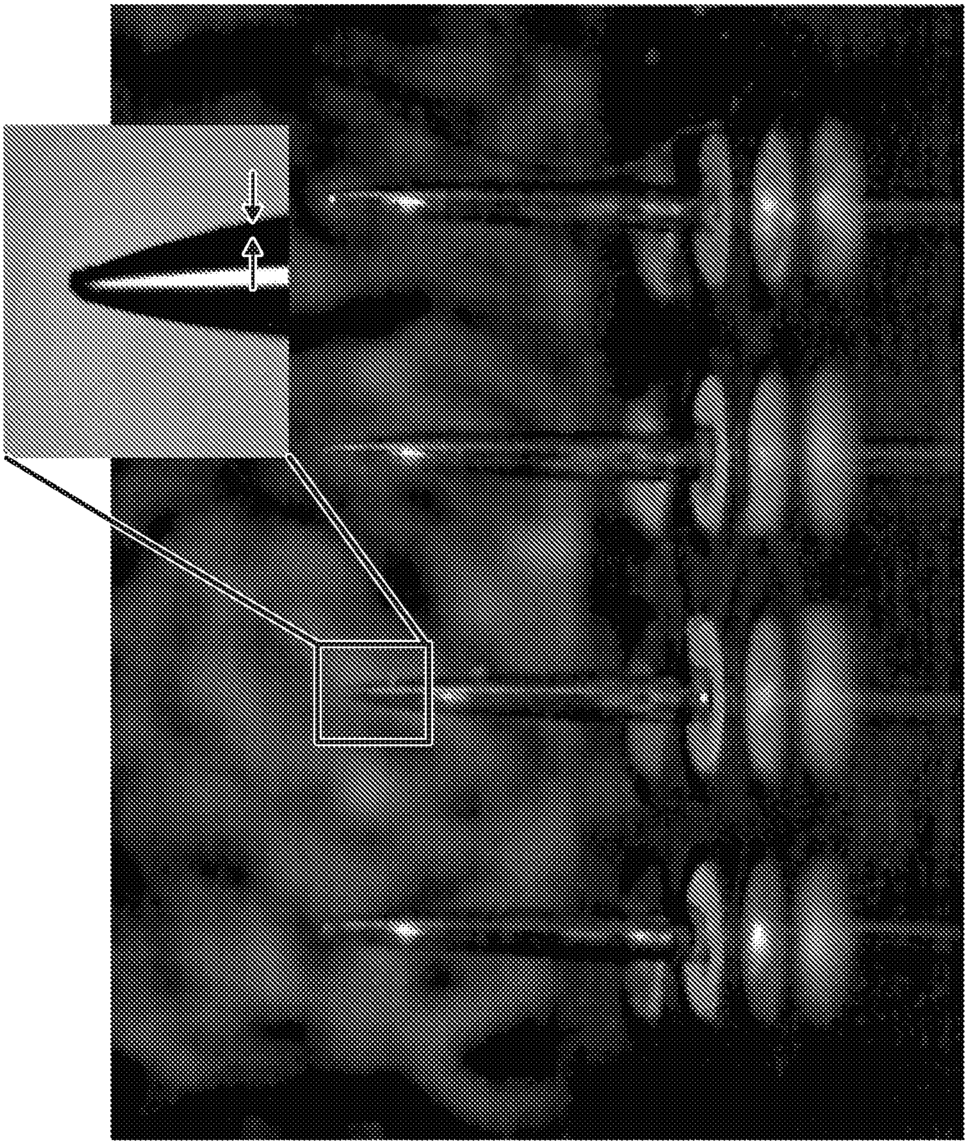
FIG. 24 is an image of penetrating microelectrodes insulated with a conformal layer of an insulating dielectric coating, in accordance with an embodiment of the invention.

FIG. 24 is an image of penetrating microelectrodes insulated with a conformal layer of an insulating dielectric coating, in experiments in accordance with an embodiment of the invention. This illustrates an example of electrical insulation comprising an insulating polymer deposited on the penetrating microelectrode of a microelectrode device. The microelectrodes are insulated with a conformal layer of poly(para-xylene) (parylene) deposited via chemical vapor deposition (CVD), ranging from 100 nm to 2 mm thick depending on the mass of the parylene dimer precursor used. Parylene is an USP Class VI polymer recognized by the FDA as a biocompatible material. The deposited parylene acts as a hydrophobic, insulating dielectric coating suitable for human implantation. Closeup of needle tip (top right) shows edge of parylene layer (white arrows).

Definitions

As used herein, a "penetrating microelectrode" is a microelectrode that is capable of penetrating skin tissue, such as a needle with a tapered tip sufficiently sharp to penetrate skin tissue.

As used herein, a "penetrating microelectrode array" is an array of more than one penetrating microelectrode.

As used herein, a "target tissue microelectrode region" of a penetrating microelectrode is a region of a penetrating microelectrode that comprises an electrically conductive surface, such as a conductive metal surface, that selectively delivers a biomolecule to cells located in a tissue location, such as the skin tissue surrounding the penetrating microelectrode, via tissue electrotransfer.

As used herein, an "anchor microelectrode region" of a penetrating microelectrode is a region of a penetrating microelectrode that assists to mechanically anchor the penetrating microelectrode within skin tissue into which the penetrating microelectrode is inserted, such as by having a coating that assists in holding the penetrating microelectrode within skin tissue into which the microelectrode is inserted, for instance by providing sufficient friction against motion of the penetrating microelectrode within the skin tissue.

As used herein, "tissue electrotransfer" can include any electroporation mediated transdermal delivery, including electrochemotherapy (ECT) and gene electrotransfer (GET).

As used herein, a "biomolecule" can include a nucleic acid, a protein or any other biological molecule to be delivered by tissue transfection in accordance with techniques taught herein, or a combination of such nucleic acids, proteins or other biological molecules. For example, the biomolecule can include one or more of: a nucleic acid or protein vaccine vector, a nucleic acid and protein vaccine vector, another vector, a nucleic acid biomolecule (for example, RNA, DNA/plasmid vector, DNA vaccine, DNA/plasmid vector vaccine) and a protein (for example, a peptide/protein, peptide/protein vaccine). In addition, a "biomolecule" can include (1) an antibody, such as a monoclonal antibody, or another ligand specific molecule, and (2) other molecules to be delivered that may have or could affect biologic and/or cellular activity.

As used herein, "nucleic acid" refers to a macromolecule composed of chains (a polymer or an oligomer) of monomeric nucleotide. The most common nucleic acids are deoxyribonucleic acid (DNA) and ribonucleic acid (RNA). It should be further understood that the present invention can be used for biomolecules containing artificial nucleic acids such as peptide nucleic acid (PNA), morpholino, locked nucleic acid (LNA), glycol nucleic acid (GNA) and threose nucleic acid (TNA), among others. In various embodiments of the present invention, nucleic acids can be derived from a variety of sources such as bacteria, virus, humans, and animals, as well as sources such as plants and fungi, among others. The source can be a pathogen. Alternatively, the source can be a synthetic organism. Nucleic acids can be genomic, extrachromosomal or synthetic. Where the term "DNA" is used herein, one of ordinary skill in the art will appreciate that the methods and devices described herein can be applied to other nucleic acids, for example, RNA or those mentioned above. In addition, the terms "nucleic acid," "polynucleotide," and "oligonucleotide" are used herein to include a polymeric form of nucleotides of any length, including, but not limited to, ribonucleotides or deoxyribonucleotides. There is no intended distinction in length between these terms. Further, these terms refer only to the primary structure of the molecule. Thus, in certain embodiments these terms can include triple-, double- and single-stranded DNA, PNA, as well as triple-, double- and single-stranded RNA. They also include modifications, such as by methylation and/or by capping, and unmodified forms of the polynucleotide. More particularly, the terms "nucleic acid," "polynucleotide," and "oligonucleotide," include polydeoxyribonucleotides (containing 2-deoxy-D-ribose), polyribonucleotides (containing D-ribose), any other type of polynucleotide which is an N- or C-glycoside of a purine or pyrimidine base, and other polymers containing nonnucleotidic backbones, for example, polyamide (e.g., peptide nucleic acids (PNAs)) and polymorpholino (commercially available from Anti-Virals, Inc., Corvallis, Oreg., U.S.A., as Neugene) polymers, and other synthetic sequence-specific nucleic acid polymers providing that the polymers contain nucleobases in a configuration which allows for base pairing and base stacking, such as is found in DNA and RNA. In addition, a "nucleic acid" can include a plasmid DNA (pDNA), such as a plasmid DNA vector.

As used herein, a "protein" is a biological molecule consisting of one or more chains of amino acids. Proteins differ from one another primarily in their sequence of amino acids, which is dictated by the nucleotide sequence of the encoding gene. A peptide is a single linear polymer chain of two or more amino acids bonded together by peptide bonds between the carboxyl and amino groups of adjacent amino acid residues; multiple peptides in a chain can be referred to as a polypeptide. Proteins can be made of one or more polypeptides. Shortly after or even during synthesis, the residues in a protein are often chemically modified by posttranslational modification, which alters the physical and chemical properties, folding, stability, activity, and ultimately, the function of the proteins. Sometimes proteins have non-peptide groups attached, which can be called prosthetic groups or cofactors.

It will be appreciated, in addition, that a biomolecule used herein can include non-natural bases and residues, for example, non-natural amino acids inserted into a biological sequence.

REFERENCES (1) Neumann, E., Schaefer-Ridder, M., Wang, Y. & Hofschneider, P. H. Gene transfer into mouse lyoma cells by electroporation in high electric fields. *The EMBO Journal* 1, 841-845 (1982).

(2) Jadoul, A. & Préat, V. Electrically enhanced transdermal delivery of domperidone. *International Journal of Pharmaceutics* 154, 229-234, doi:https://doi.org/10.1016/S0378-5173(97)00139-7 (1997).

(3) Prausnitz, M. R. A practical assessment of transdermal drug delivery by skin electroporation. *Advanced Drug Delivery Reviews* 35, 61-76, doi:https://doi.org/10.1016/S0169-409X(98)00063-5 (1999).

(4) Prausnitz, M. R., Bose, V. G., Langer, R. & Weaver, J. C. Electroporation of Mammalian Skin—a Mechanism to Enhance Transdermal Drug-Delivery. *P Natl Acad Sci USA* 90, 10504-10508, doi:DOI 10.1073/pnas.90.22.10504 (1993).

(5) Vanbever, R., LeBoulenge, E. & Preat, V. Transdermal delivery of fentanyl by electroporation. I. Influence of electrical factors. *Pharm Res* 13, 559-565 (1996).

(6) Vanbever, R., Morre, N. D. & Préat, V. Transdermal delivery of fentanyl by electroporation. II. Mechanisms involved in drug transport. *Pharm Res* 13, 1360-1366 (1996).

(7) Vanbever, R. & Préat, V. Factors affecting transdermal delivery of metoprolol by electroporation. *Bioelectrochemistry and Bioenergetics* 38, 223-228, doi:https://doi.org/10.1016/0302-4598(95)01830-8 (1995).

(8) Ita, K. Perspectives on transdermal electroporation. *Pharmaceutics* 8, 9 (2016).

(9) Mir, L. M. et al. [Electrochemotherapy, a new antitumor treatment: first clinical trial]. *C R Acad Sci III* 313, 613-618 (1991).
(10) Groselj, A. et al. Efficiency of electrochemotherapy with reduced bleomycin dose in the treatment of non-melanoma head and neck skin cancer: Preliminary results. *Head Neck* 40, 120-125, doi:10.1002/hed.24991 (2018).
(11) Wichtowski, M., Murawa, D., Kulcenty, K. & Zaleska, K. Electrochemotherapy in Breast Cancer—Discussion of the Method and Literature Review. *Breast Care* (*Basel*) 12, 409-414, doi:10.1159/000479954 (2017).
(12) Aguado-Romeo, M. J., Benot-Lopez, S. & Romero-Tabares, A. Electrochemotherapy for the Treatment of Unresectable Locoregionally Advanced Cutaneous Melanoma: A Systematic Review. *Actas Dermosifiliogr* 108, 91-97, doi:10.1016/j.ad.2016.08.008 (2017).
(13) Plaschke, C. C., Gothelf, A., Gehl, J. & Wessel, I. Electrochemotherapy of mucosal head and neck tumors: a systematic review. *Acta Oncol* 55, 1266-1272, doi:10.1080/0284186X.2016.1207803 (2016).
(14) Rotunno, R. et al. Electrochemotherapy in non-melanoma head and neck skin cancers: a three-center experience and review of the literature. *G Ital Dermatol Venereol* 151, 610-618 (2016).
(15) Schmidt, G., Juhasz-Boss, I., Solomayer, E. F. & Herr, D. Electrochemotherapy in Breast Cancer: A Review of References. *Geburtshilfe Frauenheilkd* 74, 557-562, doi:10.1055/s-0034-1368538 (2014).
(16) Queirolo, P., Marincola, F. & Spagnolo, F. Electrochemotherapy for the management of melanoma skin metastasis: a review of the literature and possible combinations with immunotherapy. *Arch Dermatol Res* 306, 521-526, doi:10.1007/s00403-014-1462-x (2014).
(17) Jahangeer, S., Forde, P., Soden, D. & Hinchion, J. Review of current thermal ablation treatment for lung cancer and the potential of electrochemotherapy as a means for treatment of lung tumours. *Cancer Treat Rev* 39, 862-871, doi:10.1016/j.ctrv.2013.03.007 (2013).
(18) Gothelf, A. & Gehl, J. Gene electrotransfer to skin; review of existing literature and clinical perspectives. *Curr Gene Ther* 10, 287-299 (2010).
(19) Favard, C., Dean, D. S. & Rols, M. P. Electrotransfer as a non viral method of gene delivery. *Current Gene Therapy* 7, 67-77, doi:Doi 10.2174/156652307779940207 (2007).
(20) Diehl, M. C. et al. Tolerability of intramuscular and intradermal delivery by CELLECTRA® adaptive constant current electroporation device in healthy volunteers. *Hum Vacc Immunother* 9, 2246-2252, doi:10.4161/hv.24702 (2013).
(21) El-Kamary, S. S. et al. Safety and Tolerability of the Easy Vax™ Clinical Epidermal Electroporation System in Healthy Adults. *Mol Ther* 20, 214-220, doi:10.1038/mt.2011.235 (2012).
(22) McCoy, J. R. et al. A multi-head intradermal electroporation device allows for tailored and increased dose DNA vaccine delivery to the skin. *Hum Vacc Immunother* 11, 746-754, doi:10.4161/21645515.2014.978223 (2015).
(23) Littel-van den Hurk, S. V. & Hannaman, D. Electroporation for DNA immunization: clinical application. *Expert Rev Vaccines* 9, 503-517, doi:10.1586/Erv.10.42 (2010).
(24) Fakharzadeh, S. S., Zhang, Y., Sarkar, R. & Kazazian, H. H. Correction of the coagulation defect in hemophilia A mice through factor VIII expression in skin. *Blood* 95, 2799-2805 (2000).
(25) Fewell, J. G. et al. Gene therapy for the treatment of hemophilia B using PINC-formulated plasmid delivered to muscle with electroporation. *Mol Ther* 3, 574-583 (2001).
(26) Yarmush, M. L., Golberg, A., Sersa, G., Kotnik, T. & Miklavcic, D. Electroporation-Based Technologies for Medicine: Principles, Applications, and Challenges. *Annu Rev Biomed Eng* 16, 295-320, doi:10.1146/annurev-bioeng-071813-104622 (2014).
(27) Babiuk, S. et al. Needle-free topical electroporation improves gene expression from plasmids administered in porcine skin. *Mol Ther* 8, 992-998, doi:10.1016/j.ymthe.2003.09.008 (2003).
(28) Becker, S. M. & Kuznetsov, A. V. Thermal damage reduction associated with in vivo skin electroporation: A numerical investigation justifying aggressive pre-cooling. *International Journal of Heat and Mass Transfer* 50, 105-116 (2007).
(29) Li, J., Tan, W., Yu, M. & Lin, H. The effect of extracellular conductivity on electroporation-mediated molecular delivery. *Bba-Biomembranes* 1828, 461-470, doi:DOI 10.1016/j.bbamem.2012.08.014 (2013).
(30) Sadik, M. M. et al. Scaling Relationship and Optimization of Double-Pulse Electroporation. *Biophys J* 106, 801-812, doi:10.1016/j.bpj.2013.12.045 (2014).
(31) Demiryurek, Y. et al. Transport, resealing, and re-poration dynamics of two-pulse electroporation-mediated molecular delivery. *Bba-Biomembranes* 1848, 1706-1714, doi:10.1016/j.bbamem.2015.04.007 (2015).
(32) Li, J. B. & Lin, H. Numerical simulation of molecular uptake via electroporation. *Bioelectrochemistry* 82, 10-21, doi:10.1016/j.bioelechem.2011.04.006 (2011).
(33) Lin, H., Sadik, M., Li, J. B., Shan, J. W. & Shreiber, D. I. Numerical Simulation of Molecular Delivery via Electroporation. *Biophys J* 100, 577-577 (2011).
(34) Dev, S. B., Rabussay, D. P., Widera, G. & Hofmann, G. A. Medical applications of electroporation. *IEEE Transactions on Plasma Science* 28, 206-223, doi:10.1109/27.842905 (2000).
(35) Nicolas, J.-F. & Guy, B. Intradermal, epidermal and transcutaneous vaccination: from immunology to clinical practice. *Expert Rev Vaccines* 7, 1201-1214, doi:10.1586/14760584.7.8.1201 (2008).
(36) Dean, H. J. Epidermal delivery of protein and DNA vaccines. *Expert Opinion on Drug Delivery* 2, 227-236, doi:10.1517/17425247.2.2.227 (2005).
(37) Lambricht, L. et al. Clinical potential of electroporation for gene therapy and DNA vaccine delivery. *Expert Opinion on Drug Delivery* 13, 295-310, doi:10.1517/17425247.2016.1121990 (2016).
(38) REVEAL 1 (Evaluation of VGX-3100 and Electroporation for the Treatment of Cervical HSIL), <https://ClinicalTrials.gov/show/NCT03185013>(
(39) Azam, B. Electroporation—Advantages and Drawbacks for Delivery of Drug, Gene and Vaccine. doi:10.5772/58376 (2014).
(40) El-Kamary, S. S. et al. Safety and Tolerability of the Easy Vax™ Clinical Epidermal Electroporation System in Healthy Adults. *Mol Ther* 20, 214-220, doi:https://doi.org/10.1038/mt.2011.235 (2012).
(41) Wallace, M. et al. Tolerability of Two Sequential Electroporation Treatments Using MedPulser DNA Delivery System (DDS) in Healthy Adults. *Mol Ther* 17, 922-928, doi:https://doi.org/10.1038/mt.2009.27 (2009).
(42) Wake, K., Sasaki, K. & Watanabe, S. Conductivities of epidermis, dermis, and subcutaneous tissue at intermediate frequencies. *Phys Med Biol* 61, 4376-4389, doi:10.1088/0031-9155/61/12/4376 (2016).
(43) Sorrell, J. M. & Caplan, A. I. Fibroblast heterogeneity: more than skin deep. *Journal of Cell Science* 117, 667-675, doi:10.1242/jcs.01005 (2004).
(44) Gill, H. S. & Prausnitz, M. R. Coated microneedles for transdermal delivery. J Control Release 117, 227-237, doi:10.1016/j.jconrel.2006.10.017 (2007).
(45) Gill, H. S., Soderholm, J., Prausnitz, M. R. & Sallberg, M. Cutaneous vaccination using microneedles coated with hepatitis C DNA vaccine. *Gene Ther* 17, 811-814, doi:10.1038/gt.2010.22 (2010).
(46) Haj-Ahmad, R. et al. Microneedle Coating Techniques for Transdermal Drug Delivery. *Pharmaceutics* 7, 486-502, doi:10.3390/pharmaceutics7040486 (2015).
(47) Kuppusami, S. & Oskouei, R. H. Parylene Coatings in Medical Devices and Implants: A Review. *Universal Journal of Biomedical Engineering* 3, 9-14, doi:10.13189/ujbe.2015.030201 (2015).
(48) Jung, E. C. & Maibach, H. I. in Topical Drug Bioavailability, Bioequivalence, and Penetration (eds Vinod P. Shah, Howard I. Maibach, & John Jenner) 21-40 (Springer New York, 2014).
(49) Capt, A., Luzy, A. P., Esdaile, D. & Blanck, O. Comparison of the human skin grafted onto nude mouse model with in vivo and in vitro models in the prediction of percutaneous penetration of three lipophilic pesticides. *Regulatory Toxicology and Pharmacology* 47, 274-287, doi:https://doi.org/10.1016/j.yrtph.2006.11.008 (2007).
(50) Van Ravenzwaay, B. & Leibold, E. A comparison between in vitro rat and human and in vivo rat skin absorption studies. *Human & Experimental Toxicology* 23, 421-430, doi:10.1191/0960327104ht471oa (2004).
(51) Takeuchi, H. et al. Usefulness of Rat Skin as a Substitute for Human Skin in the in Vitro Skin Permeation Study. Vol. 60 (2011).
(52) Dujardin, N., Van der Smissen, P. & Preat, V. Topical gene transfer into rat skin using electroporation. *Pharmaceutical Research* 18, 61-66, doi:Doi 10.1023/A:1011026726938 (2001).
(53) Vanbever, R. & Preat, V. In vivo efficacy and safety of skin electroporation. *Advanced Drug Delivery Reviews* 35, 77-88, doi:Doi 10.1016/S0169-409x(98)00064-7 (1999).
(54) Pearton, M. et al. Microneedle delivery of plasmid DNA to living human skin: formulation coating, skin insertion and gene expression. *J Control Release* 160, 561-569, doi:10.1016/j.jconrel.2012.04.005 (2012).

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A microelectrode device for tissue electrotransfer, the microelectrode device comprising:

a penetrating microelectrode comprising (i) a target tissue microelectrode region comprising an electrically conductive surface to selectively deliver, via tissue electrotransfer, a biomolecule to cells located in a tissue location; and (ii) an anchor microelectrode region to mechanically anchor the penetrating microelectrode to position the target tissue microelectrode region to selectively deliver the biomolecule to the cells located in the tissue location;

an electrical connection to connect the penetrating microelectrode to a voltage source; and a modeling processor comprising a tissue level electric field prediction module modeling an electric field distribution in the tissue location and a cellular level simulation module modeling local cell impedance at the cell level, the modeling processor being configured to update the electric field distribution in the tissue location to reflect the local cell impedance at the cell level, the modeling processor being configured to determine tissue locations to which to selectively deliver, via tissue electrotransfer, a biomolecule to cells located in the tissue location.

2. The microelectrode device of claim 1, wherein the anchor microelectrode region is at or near a distal end of the penetrating microelectrode.

3. The microelectrode device of claim 1, comprising electrical insulation on a surface of the penetrating microelectrode, distinct from the electrically conductive surface of the target tissue microelectrode region.

4. The microelectrode device of claim 3, comprising electrical insulation on a surface of the anchor microelectrode region.

5. The microelectrode device of claim 3, wherein the electrical insulation comprises an insulating polymer deposited on the penetrating microelectrode.

6. The microelectrode device of claim 1, comprising a biomolecule coating, comprising the biomolecule to be selectively delivered, on at least part of a surface of the target tissue microelectrode region.

7. The microelectrode device of claim 6, wherein the biomolecule coating is dissolvable when surrounded by skin tissue.

8. The microelectrode device of claim 6, wherein the biomolecule coating comprises at least one of a nucleic acid and a protein.

9. The microelectrode device of claim 1, wherein the tissue location is below a stratum corneum layer of skin and at least one of (i) within at least part of an epidermal layer of skin and (ii) within at least part of the dermal layer of skin.

10. The microelectrode device of claim 1, wherein the tissue location is within at least a part of only an epidermal layer of skin.

11. The microelectrode device of claim 1, wherein the anchor microelectrode region comprises a barb.

12. The microelectrode device of claim 1, wherein the anchor microelectrode region comprises an adhesion surface coating.

13. The microelectrode device of claim 1, comprising more than one of the penetrating microelectrode, a center-to-center spacing of the more than one of the penetrating microelectrode comprising a spacing between about 300 micrometers and about 1.5 millimeters.

14. The microelectrode device of claim 1, wherein the length of the penetrating microelectrode comprises a length between about 225 micrometers and about 1250 micrometers.

15. The microelectrode device of claim 1, wherein the penetrating microelectrode comprises at least one of: a needle comprising a tapered tip; and a needle comprising a lateral protrusion.

16. The microelectrode device of claim 1, the penetrating microelectrode comprising a diameter between about 100 micrometers and about 500 micrometers.

17. The microelectrode device of claim 1, wherein the electrical connection applies a pulsed voltage from the voltage source to the penetrating microelectrode to create a transient permeabilization of a cell membrane of tissue in at least one of an epidermal layer of skin and a dermal layer of skin.

18. The microelectrode device of claim 1, wherein the electrical connection applies a voltage from the voltage source to the penetrating microelectrode to create a maximum electric field strength of between about 0.1 kilovolts (kV) per centimeter and about 10 kilovolts (kV) per centimeter in skin tissue surrounding the penetrating microelectrode.

19. The microelectrode device of claim 1, wherein the electrical connection comprises a connection defined by photolithography, the penetrating microelectrode comprises an electrode base defined by photolithography, and the penetrating microelectrode comprises electroplated metal.

20. The microelectrode device of claim 1, comprising more than one of the penetrating microelectrode, and wherein the electrical connection comprises an electrically independent connection to two or more of the more than one penetrating microelectrodes.

21. The microelectrode device of claim 1, comprising more than one target tissue microelectrode region each to selectively deliver a different biomolecule.

22. The microelectrode device of claim 1, wherein the modeling processor is configured to determine a control voltage delivered by the voltage source to the penetrating microelectrode.

23. The microelectrode device of claim 22, wherein the modeling processor is configured to determine the control voltage, using the electric field distribution updated by the local cell impedance at the cell level, such that the control voltage will permit tissue electrotransfer while minimizing tissue damage.

24. A method of performing tissue electrotransfer with a penetrating microelectrode, the method comprising:

anchoring a penetrating microelectrode, using an anchor microelectrode region of the penetrating microelectrode, such that a target tissue microelectrode region of the penetrating microelectrode, comprising an electrically conductive surface, is positioned to selectively deliver a biomolecule to cells located in a tissue location;

applying a voltage to the penetrating microelectrode to deliver the biomolecule to the cells located in the tissue location;

using a modeling processor, predicting a tissue level electric field by modeling an electric field distribution in the tissue location and performing a cellular level simulation of the tissue location by modeling local cell impedance at the cell level;

updating the electric field distribution in the tissue location to reflect the local cell impedance at the cell level; and with the modeling processor, determining tissue locations to which to selectively deliver, via tissue electrotransfer, a biomolecule to cells located in the tissue location.

25. The method of claim 24, further comprising using the modeling processor to control a voltage delivered by the voltage source to the penetrating microelectrode.

26. The method of claim 25, further comprising using the modeling processor to determine the control voltage, using the electric field distribution updated by the local cell impedance at the cell level, such that the control voltage will permit tissue electrotransfer while minimizing tissue damage.

* * * * *